(12) United States Patent
Moreno et al.

(10) Patent No.: US 7,443,547 B2
(45) Date of Patent: Oct. 28, 2008

(54) PORTABLE ELECTRONIC FAXING, SCANNING, COPYING, AND PRINTING DEVICE

(75) Inventors: Mario Moreno, Raleigh, NC (US); Robert Cichielo, Asbury, NJ (US); Michael J. Keating, Blairstown, NJ (US)

(73) Assignee: Science Forge, Inc., Hardwick, NJ (US)

( * ) Notice: Subject to any disclaimer, the term of this patent is extended or adjusted under 35 U.S.C. 154(b) by 637 days.

(21) Appl. No.: 10/884,594

(22) Filed: Jul. 3, 2004

(65) Prior Publication Data

US 2006/0001920 A1    Jan. 5, 2006

(51) Int. Cl.
H04N 1/024 (2006.01)
H04N 1/40 (2006.01)
H04N 1/00 (2006.01)

(52) U.S. Cl. .................. 358/472; 358/471; 358/401; 358/400

(58) Field of Classification Search .................. 358/417, 358/472, 498
See application file for complete search history.

(56) References Cited

U.S. PATENT DOCUMENTS

| | | | |
|---|---|---|---|
| 5,379,121 A * | 1/1995 | Yamada et al. .............. 358/400 |
| 5,420,697 A | 5/1995 | Tuli | |
| 5,886,795 A | 3/1999 | Tsukamoto et al. | |
| 6,011,634 A | 1/2000 | Aihara et al. | |
| 6,128,103 A * | 10/2000 | Kawamura .................. 358/434 |
| 6,154,242 A | 11/2000 | Tuli | |
| 6,285,469 B1 | 9/2001 | Tuli | |
| 6,609,844 B1 * | 8/2003 | Petteruti et al. ............... 400/88 |
| 2005/0068571 A1 * | 3/2005 | Hart et al. .................. 358/1.15 |
| 2005/0068572 A1 * | 3/2005 | Hart et al. .................. 358/1.15 |

* cited by examiner

Primary Examiner—Twyler L. Haskins
Assistant Examiner—Fred Guillermety
(74) Attorney, Agent, or Firm—Law Offices of Rita C. Chipperson, P.C.

(57) ABSTRACT

A lightweight, battery operated, portable, personal electronic device capable of faxing, scanning, printing and copying media as a standalone device or in cooperation with other electronic devices including PCs, mobile telephones, PDAs, etc. is provided. The device automatically detects the presence of fax-capable devices and reconfigures the software for compatibility with the fax-capable device eliminating the need for user programming. The device's ergonomic design, intrinsic physical stability, and same side paper feeds and user interface provide use in work areas having limited space. The device includes unidirectional, independent pathways for original and recording media such that paper jams are minimized. Portability is maximized through innovative power management software and hardware.

20 Claims, 20 Drawing Sheets

PORTABLE ELECTRONIC FAXING, SCANNING, COPYING, AND PRINTING DEVICE

TECHNICAL FIELD OF THE INVENTION

The present invention relates to electronic devices for scanning, printing, faxing, and/or copying media. More specifically, the present invention relates to lightweight, aesthetic, ergonomic, inexpensive, stable, low power consumption, portable electronic devices capable of efficiently and quickly performing independent and simultaneous scanning, printing, faxing, and true copying functions without a proclivity for paper jams. Although the present invention is capable of operating as a completely standalone device, it is also designed to operate in conjunction with external microprocessor-based devices including, but not limited to, desktop personal computers ("PCs"), laptop PCs, handheld personal data assistants ("PDAs"), and mobile telephones (e.g., cellular telephones).

BACKGROUND OF THE INVENTION

Heretofore, individuals and businesses have used a wide variety of devices for scanning, printing, faxing, and copying media. Although these devices were originally created and designed for non-portable office use, the consumer drive towards lower cost, smaller size, multiple use personal devices, as well as the increased use of wireless technology, has created a greater demand for compact portable devices capable of performing one or more of the aforementioned functions.

It is well known that both portable and non-portable electronic devices exist for performing dedicated functions such as faxing, scanning, printing, and copying media. Combination devices, which are capable of performing two or more of these functions, are also commercially available. However, the majority of these non-portable devices are designed for use in an office "desktop" environment. As such, these devices are not optimized for stability, small size, low power usage, "on-the-go" convenience.

The following references, which are discussed below, were found to relate to the field of portable electronic devices having scanning, printing, faxing, and/or copying functions: Tsukamoto et al. U.S. Pat. No. 5,886,795 ("Tsukamoto"), Aihara et al. U.S. Pat. No. 6,011,634 ("Aihara"), Petteruti et al. U.S. Pat. No. 6,609,844 ("Petteruti"), Tuli U.S. Pat. No. 6,285,469 ("the '469 patent"), Tuli U.S. Pat. No. 5,420,697 ("the '697 patent"), and Tuli U.S. Pat. No. 6,154,242 ("the '242 patent").

Tsukamoto describes a facsimile apparatus that enables manual manipulation of one or more sheets of recording media while the apparatus is performing a faxing function. Tsukamoto discloses a device that allows a user to hold the communication line during manual manipulation of the recording media such that a discontinuous feed of such media does not cause an error in the facsimile communication.

Aihara also discloses a facsimile apparatus. This apparatus is intended for portable use and allows image data intended for facsimile transmission to be displayed on an integral liquid crystal display ("LCD"). Furthermore, the apparatus disclosed in Aihara allows a user to selectively edit the image data intended for facsimile transmission, thereby allowing the user to transmit only the necessary or desired portion of the image data.

Petteruti discloses a portable printer capable of printing data on either pre-cut paper or rolls of paper. The apparatus disclosed in Petteruti also includes an automatic print alignment technique that allows the device to print on print media having varying widths.

The '469 patent discloses a portable device for performing scanning, printing, faxing, and copying functions. The device is compact and has fold out stability arms, without which the device is unstable in its upright operating mode. Both the printing and scanning functions rely on a single roller mechanism for handling the recording and original media, respectively. The single roller transports the original and recording media through the device independently or simultaneously, as required by the user.

The '697 patent also discloses a portable device for performing scanning, printing, faxing, and copying functions. The disclosed device includes a thermal print head, wherein the thermal print head and the scan head are located on opposite sides of a single roller mechanism. Similar to the device disclosed in the '469 patent as discussed above, both the printing and scanning functions rely on a single roller mechanism for handling the recording and original media, respectively. Also, the single roller transports the original and recording media through the device independently or simultaneously, as required by the user.

Similar to the '697 patent, the '242 patent also discloses a portable device that incorporates a thermal print head and is capable of performing scanning, printing, faxing, and copying functions. This patent further discloses an arrangement of narrow thermal print heads for use with wide format thermal printers.

In light of the prior art, a portion of which is discussed above, there exists a clear need for a lightweight, aesthetic, ergonomic, inexpensive, stable, user-friendly, multi-communication protocol, low power consumption, portable device capable of efficiently and quickly performing independent and simultaneous scanning, printing, faxing, and true copying functions without a proclivity for paper jams.

In addition, a need exists for a portable device capable of performing independent scanning, printing, faxing, and copying functions that allows both the original and recording media to be input on the same side of the device without obstructing the device's user friendly user interface.

Further, it would be desirable to achieve a portable device capable of performing independent scanning, printing, faxing, and copying functions that is also designed to optimize battery life.

Furthermore, a need exists for a portable device capable of performing independent scanning, printing, faxing, and copying functions via two completely independent paper feeds, in lieu of a single paper feed, to allow separate functions to be performed simultaneously, rather than relying on a first function to complete in order to "free up" a single paper feed.

In addition, it would be useful to obtain a portable device capable of performing scanning, printing, faxing, and copying functions that performs a true copy function in lieu of simulating a copying function by first scanning the document to be copied to memory, and, second, printing the data stored in memory.

Also, a need exists for a portable device for scanning, printing, faxing, and copying that is inherently stable despite its small weight and size, and is not difficult to use or prone to breakage and paper jams.

Further, there is a requirement in the art for portable devices for scanning, printing, faxing, and copying that have full compatibility with all existing communication standards including, but not limited to, RS-232, 802.11, Universal Serial Bus ("USB"), Infrared Data Association® ("IrDA®"), Bluetooth®, General Packet Radio Service ("GPRS"), Ethernet, and Ultra Wide Band ("UWB"), thereby rendering these devices compatible with any external electronic device communicating via these commonly known and used communication protocols.

Finally, a need exists for portable devices for scanning, printing, copying, and faxing that do not require manual configuration of integral communication ports, thereby enabling unsophisticated users to obtain ease of operation and user-friendliness.

Thus, in light of the prior art discussed herein, there is a clear need for an improved portable, multi-function, personal electronic device. More specifically, a need exists for a compact, lightweight, structurally stable, energy efficient, aesthetic, ergonomic, inexpensive, user-friendly, multi-communication protocol, and portable electronic device that provides multiple functions such as faxing, scanning, printing, and/or copying media.

SUMMARY OF THE INVENTION

The foregoing need is addressed by the teachings of the present invention, which relates generally to an improved portable, multi-function, personal electronic device. Specifically, the portable electronic device of the present invention allows any user, whether computer savvy or computer illiterate, to perform multiple functions (e.g., fax, copy, print, scan, etc.) outside a typical office environment by providing an inexpensive, lightweight, portable electronic device that is compatible with the majority of commonly known and used communication protocols, does not require programming, has the stability to be used on irregular surfaces (e.g., the passenger seat of a vehicle, a person's lap, etc.), allows multiple operations to be performed simultaneously, and operates on low levels of power such that the device may be used extensively between recharging of the battery.

To achieve portability, the electronic device of the present invention accepts a DC power supply from a variety of standard DC power supplies known in the art including, but not limited to, universal AC input wall-mount DC power supplies, automobile cigarette lighter adapters, airplane power adapters, etc. Power management hardware and software is incorporated in the design of the present invention to minimize power consumption in an effort to maximize the length of use between recharging of the battery.

To maximize the communication protocol compatibility of the present invention, it includes a multitude of integral communication ports including a Public Switched Telephone Network ("PSTN") port (e.g., a Registered Jack-11 ("RJ-11") port), RS-232 port, USB port, and IrDA® port. Also, the device is designed for use with multiple interchangeable, accessory communication modules. Each interchangeable accessory module offers compatibility with an existing, commonly known and used communication protocol that is not integral to the electronic device including, but not limited to, 802.11, Bluetooth®, GPRS, Ethernet, UWB, etc. The present invention is also designed for compatibility with accessory modules to be designed in the future as new communication protocols are created or existing, lesser-known communication protocols become more widely used. Alternate embodiments of the present invention are envisioned in which any one or more of the accessory module communication ports of the preferred embodiment of the present invention are included as integral communication ports rather than accessory module ports.

Both the integral and interchangeable communication ports allow the present invention to exchange data with external devices such as PCs, laptop PCs, PDAs, etc. In addition, these ports allow the device to perform fax functions via external fax-capable devices equipped for one of the aforementioned communication protocols by simply connecting it to the appropriate port. Furthermore, the present invention minimizes the level of computer savvy required to operate the electronic device by automatically detecting a connected, external fax-capable device and automatically reconfiguring the internal settings of the electronic device to communicate with the external fax-capable device without requiring re-programming by a user. Similarly, the electronic device also automatically recognizes the insertion of a new accessory module, identifies the accessory module, and automatically reconfigures the internal settings of electronic device to allow it to communicate through the accessory module without requiring re-programming by the user.

For increased portability, the present invention is designed to be extremely lightweight and contained in an intrinsically stable, ergonomic housing. For example, the housing of the preferred embodiment of the present invention resembles has a varying height of approximately 1.9 inches to 5 inches, a width of approximately 11.6 inches, and a depth of approximately 5 inches and weighs approximately 3 pounds.

In addition, the geometry of the housing is designed to provide stability during portable, non-standard office use, incorporating ratios of width to depth and width to height selected to lower the center of gravity of the electronic device. As a result, the housing exhibits a low profile for stable operation in work areas having limited space and/or irregular surfaces (e.g., the passenger seat of a vehicle, a person's lap, etc.) and eliminates the need for additional structural support members such as legs or extensions, which may be cumbersome to set up and which may fail during the intended use of the electronic device.

In addition to stability, the housing is designed to mechanically support internally housed electronic and electromechanical components in a manner that facilitates paper handling and minimizes the occurrence of paper jams. For example, the two independent, vertically staggered, lower and upper paper ports are designed such that both original and recording media are fed into the electronic device at the front side of the device. This requirement eliminates the need for a user to peer over or rotate the electronic device to insert either the original or recording media into the rear side of the device, thereby minimizing the risk of a paper jam due to inadvertent or intentional movement or jostling of the electronic device.

The location of the internal components also requires media to be fed into the electronic device to the left of the front face of the device such that the user interface is not obstructed. This requirement also acts to minimize paper jams, as the user does not need to disrupt original or recording media in order to view or enter commands via the user interface. This is particularly important in small, portable devices, because jostling the machine during media insertion or movement of the inserted media to access the user interface can easily create problems with media alignment, thereby increasing the likelihood of paper jams.

In addition to minimizing paper jams, the same side paper feeds, parallel paper pathways, and simultaneous scanning and printing minimize the required workspace around the unit. Due to the well-designed spatial arrangement of the internal components, as well as the prescribed method of operation, the effective work area required for copying a document is only slightly larger than the size of the document, thereby providing true "on-the-go" performance.

The present invention is further equipped with lower and upper paper port detection sensors that provide validation information regarding the position and alignment of media fed into the respective lower or upper paper port. This position and alignment data initiates the auto-copy function, which automatically photocopies a document properly inserted and aligned in the lower paper port when recording media is present and properly aligned in the upper paper port. This position and alignment data also synchronizes the scanning and printing processes during copying via control of a mechanical trigger.

The mechanical trigger maintains the upper paper port roller gear in an engaged or disengaged state with respect to the roller rotation mechanism of the present invention without the need for continuous power. More specifically, a temporary power pulse of the appropriate polarity (i.e., the engage or disengage polarity) is applied to an actuator that moves the mechanical trigger until its maximum compression point is exceeded, causing the spring force of the mechanical trigger to move the upper paper port roller gear away from its present state (i.e., engaged or disengaged) to its opposite state. The electrical signal to the actuator is removed after the spring force of the mechanical trigger changes the state of the upper paper port roller gear.

Relying on the mechanical spring action of the mechanical trigger to drive the upper paper port roller gear to its engaged or disengaged position eliminates the need for a continuous electrical signal to the upper paper port roller gear, thereby minimizing the power consumed by electronic device. If engagement of the upper paper port roller gear must be sustained by continuously energizing a solenoid, as is commonly performed in the art, its continuous power consumption drastically reduces the length of time that the electronic device may operate on battery power without recharging. This reduction in use would severely limit the portability of the electronic device, as the device will require more frequent recharging. Therefore, advantageously, the present invention is designed to supply a temporary low voltage, low current power pulse to temporarily modify the position of the mechanical trigger until its mechanical spring action changes the state of the upper paper port roller gear.

To further maximize battery life, the present invention includes a print power management algorithm. This algorithm saves power by analyzing the document to be printed prior to printing such that the power consumed during the print function is minimized. First, the algorithm determines the maximum number of elements that can be burned simultaneously in all quadrants of the media to be printed. Thereafter, the algorithm senses the print head temperature and adjusts the burn time, if possible, based upon the instantaneous print head temperature. These two variables are analyzed to minimize the total burn time for any given document, thereby minimizing the power required for the print function.

Finally, the present invention includes a true copying function. In other words, the electronic device of the present invention prints the data scanned from the media being copied virtually simultaneously with scanning. Due to the device's unique design including, but not limited to, the incorporation of two independent rollers and two independent paper paths, it is not necessary to wait until the document to be copied is scanned to memory to free up a roller and/or paper path to perform printing of the scanned data.

Thus, as is apparent from the summary of the invention, it is an object of the present invention to provide methods and apparatus for a portable electronic device that allows both the original and recording media to be input on the same side of the device without obstructing the device's user friendly, user interface.

Further, it is an object of the present invention to provide methods and apparatus for a portable electronic device that is also designed to optimize battery life.

Moreover, it is an object of the present invention to provide methods and apparatus for a portable electronic device capable of performing independent functions via two completely independent paper feeds such that separate functions may be performed simultaneously.

It is a further object of the present invention to provide methods and apparatus for a portable electronic device capable of performing a true copy function rather than sequential scan and print functions.

Furthermore, it is an object of the present invention to provide methods and apparatus for a lightweight portable electronic device that is inherently stable despite its small size.

In addition, it is an object of the present invention to provide methods and apparatus for a portable, lightweight electronic device that is not prone to breakage or paper jams despite its small size.

Further, it is an object of the present invention to provide methods and apparatus for a portable electronic device compatible with existing communication standards such as RS-232, 802.11, USB, IrDA®, Bluetooth®, GPRS, Ethernet, and UWB without requiring a user to reprogram the portable electronic device to switch between various communication protocols.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
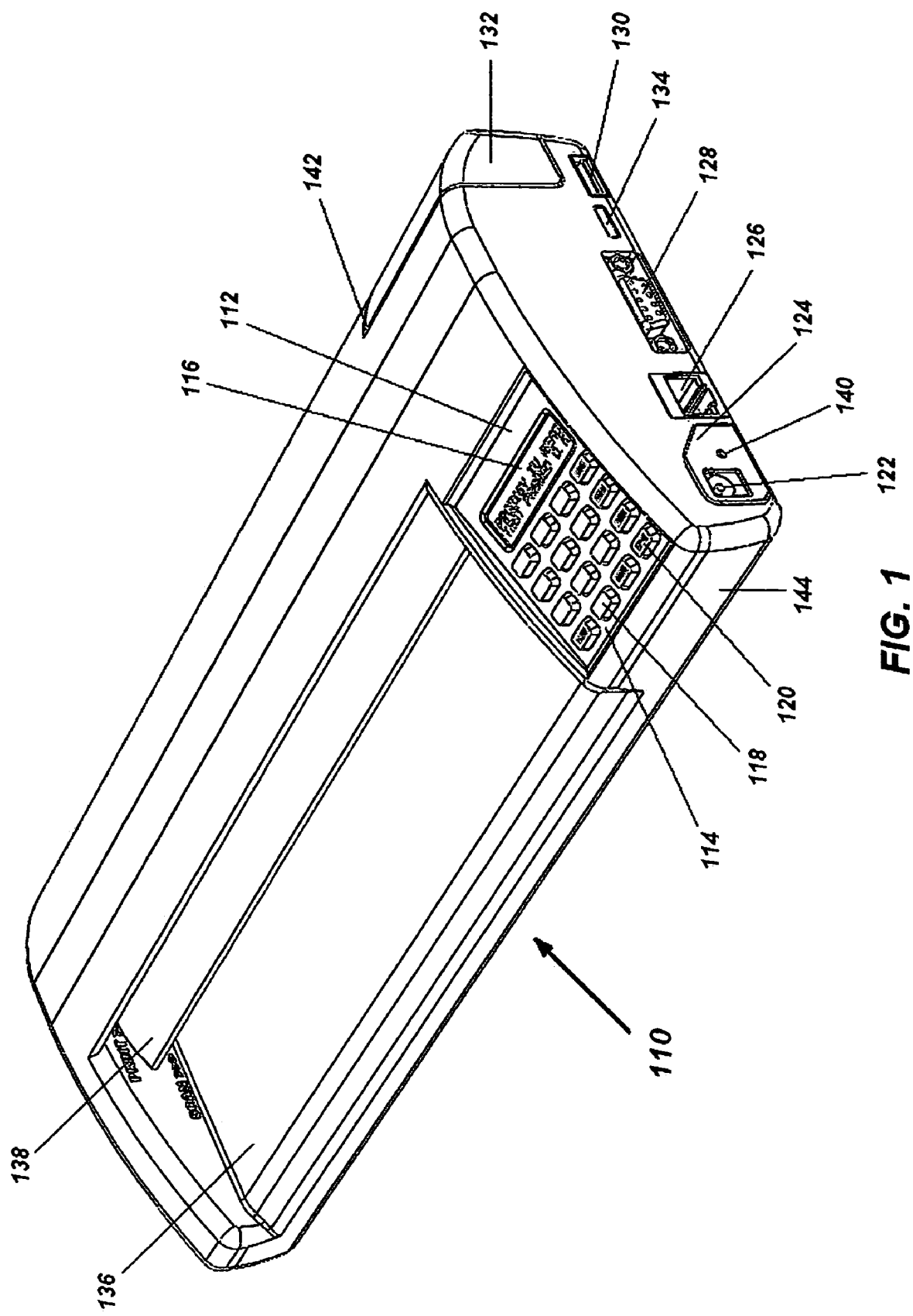
FIG. 1 is a plan view of the front and right sides of the portable electronic device in accordance with the preferred embodiment of the present invention including two paper ports, an alphanumeric keypad and LCD user interface, power port and light emitting diode ("LED") indicator, PSTN, RS-232, IrDA®, and USB communications ports, and a right view of a communication module.

Referring initially to FIG. 1, in accordance with the preferred embodiment of the present invention, depicted is electronic device 110. Electronic device 110 is a multifunction device capable of performing faxing, scanning, printing, and copying functions. As shown in FIG. 1, electronic device 110 includes, inter alia, user interface 112, power port 122, power module 124, PSTN port 126, RS-232 port 128, USB port 130, accessory module 132, IrDA® port 134, lower paper port 136, and upper paper port 138.

User interface 112 allows a user to operate and program electronic device 110. In the preferred embodiment of the present invention, input is accepted from a user via keypad 114, which includes ten (10) numeric keys 118 (i.e., the non-shaded keys) and six (6) function keys 120 (i.e., the shaded keys). Numeric keys 118 represent the numbers 0, 1, 2, 3, 4, 5, 6, 7, 8, and 9 and allow users to enter telephone numbers (e.g., when performing the fax function), as well as other information such as number of copies, menu selections, resolution, etc. In contrast, function keys 120 have dedicated functions including power, scan, fax, copy, print, and menu. The menu function allows the user to adjust settings such as fax resolution, copy quantity, date, time, transmitted fax information, etc. In an alternate embodiment, one or more keys included in function keys 120 are programmable and may be defined by the user.

Although the preferred embodiment of the present invention includes sixteen (16) numeric and function keys 118 and 120, respectively, it should be noted that the present invention could be implemented with any quantity of numeric keys 118 and function keys 120. Alternatively, the present invention may be implemented with any one of a large quantity of non-keypad user interfaces known in the art including, but not limited to, touch screens, screens with styli, voice activated interfaces, etc.

User interface 112 also includes display 116, which allows electronic device 110 to display device related information such as operating statuses and prompts to a user. In the preferred embodiment of the present invention, display 116 is a monochrome or color alphanumeric LCD. Status displays include, but are not limited to, dialing status, scanning percent complete, uploading percent complete, number of total pages transmitted by fax, page number of the page under transmission, page number of the page being received, page number of the page being printed, page number of the page being copied, electronic device 110 statuses (e.g., error, normal, paper jam, etc.), telephone line status (e.g., busy, off-hook, etc.), etc. Prompt displays may include, but are not limited to, insert paper, enter telephone number, enter copy quantity, etc.

In the preferred embodiment of the present invention, user interface 112 also includes audio device 422 in the form of a piezo-electric transducer, as discussed below with respect to FIG. 4. Audio device 422 is located internal to electronic device 110 (i.e., it is not visible from the exterior of electronic device 110) and provides an audible notification to the user that attention to electronic device 110 is required (e.g., user input is required, an alarm is displayed on display 116, etc.).

Still referring to FIG. 1, power module 124 is located on the right side of electronic device 110. Power module 124 includes power port 122 and lamp 140. Power port 122 accepts a DC power supply from a variety of standard DC power supplies known in the art including, but not limited to, universal AC input wall-mount DC power supplies, automobile cigarette lighter adapters, airplane power adapters, etc., and provides power to battery charger subsystem 518 (FIG. 5), as discussed in further detail below with respect to FIG. 5.

Lamp 140 provides status indications to the user including power port 122 status, battery charging status, and battery charged status. That is, lamp 140 is not illuminated when power is not connected to power module 124, and is illuminated in either a blinking or constant state of illumination when power is connected to power module 124. A blinking state of illumination indicates that power is connected to power port 122 and batteries 512 (FIG. 5) are recharging. In contrast, a constant state of illumination indicates that power is connected to power port 122 and batteries 512 are fully charged. In the preferred embodiment of the present invention, only one lamp 140 is incorporated to provide the status indications discussed above. However, alternative embodiments of the present invention may be created with additional lamps and/or additional status indications without departing from the spirit and scope of the present invention.

Also as depicted in FIG. 1, electronic device 110 includes a plurality of built-in communication ports including PSTN port 126, RS-232 port 128, USB port 130, and IrDA® port 134. For the preferred embodiment of the present invention, PSTN port 126 is a standard RJ-11 port, as known in the art, for connection to a standard RJ-11 telephone jack allowing electronic device 110 to connect to a telephone line for use with the faxing functions. Similarly, RS-232 port 128, USB port 130, and IrDA® port 134 are standard communication ports known in the art. These ports allow electronic device 110 to exchange data with external devices such as PCs, laptop PCs, PDAs, etc. Data received from an external device via RS-232 port 128, USB port 130, or IrDA® port 134 may be printed or faxed. Similarly, data scanned by electronic device 110 may be transmitted to an external device via one of the aforementioned ports for storage.

In addition to the integrated PSTN port 126, RS-232 port 128, USB port 130, and IrDA® port 134, electronic device 110 includes accessory module bay 142, which is designed to accept a variety of accessory modules 132. In the lowest cost model of the preferred embodiment of the present invention, accessory module 132 is replaced with an empty cover that protects the internal accessory module bay 142 from environmental conditions such as dirt, dust, moisture, etc. In a higher cost model, or when a user purchases one or more accessory modules 132 as optional equipment, each accessory module 132 allows electronic device 110 to communicate via one of the commonly used communication standards including, but not limited to, 802.11, Bluetooth®, GPRS, Ethernet, and UWB. In addition, electronic device 110 has been designed with the capacity to accept and identify communication modules for communication protocols not yet known or commonly used in the art as discussed in detail below with respect to FIG. 4.

When two or more accessory modules 132 are employed, each accessory module 132 is simply inserted to meet the communication needs of the user. For example, if a user wishes to fax a document via a fax-capable 802.11 device, such as a mobile telephone, the user simply inserts the 802.11 accessory module 132 into accessory module bay 142. In this example, electronic device 110 automatically recognizes the insertion of a new accessory module 132 and automatically reconfigures the internal settings of electronic device 110 to communicate using an 802.11 communication protocol as discussed in greater detail below with respect to FIG. 13.

In accordance with the preferred embodiment of the present invention, electronic device 110 is encased in an ergonomically designed housing 144 having a shape that resembles a rectangular prism with a curved top. The preferred embodiment of the present invention has a varying height of approximately 1.9 inches to 5 inches, a width of approximately 11.6 inches, and a depth of approximately 5 inches. These dimensions are chosen to minimize the weight and size of the present invention such that maximum portability is achieved. However, alternate embodiments are envisioned having entirely different dimensions without departing from the scope of the present invention. More specifically, many of the features described or claimed herein may be applied to larger or smaller, heavier or lighter, non-portable or portable electronic devices having similar functionality without departing from the scope of the present invention. Furthermore, the exact dimensions of the electronic device may vary depending on factors such as desired paper size, the size of user interface 112, etc.

The geometry of housing 144 is selected to provide stability during portable, non-standard office use. That is, the ratios of width to depth and width to height are selected to lower the center of gravity of electronic device 110. As a result, housing 144 exhibits a low profile for stable operation in work areas having limited space and/or irregular surfaces (e.g., the passenger seat of a vehicle, a person's lap, etc.). The design of electronic device 110 eliminates the need for additional structural support members such as legs or extensions, which may be cumbersome to set up and which may fail during the intended use of electronic device 110.

In addition to stability, housing 144 is designed to mechanically support internally housed electronic and electromechanical components such as keypad 114, scan head 432 (FIG. 4), print head 434 (FIG. 4), motor 440 (FIG. 4), lower paper port roller 618 (FIGS. 6B-6D), upper paper port roller 620 (FIGS. 6B-6D), etc. in a manner that facilitates paper handling and minimizes the occurrence of paper jams. The internal orientation of these components allows both original and recording media to be fed into electronic device 110 from the same, front side of the device. This feature eliminates the need for a user to peer over or rotate electronic device 110 to insert either the original or recording media into the rear side of the device, thereby minimizing the risk of a paper jam due to inadvertent or intentional movement of electronic device 110.

Furthermore, as illustrated in FIG. 1, the location of the internal components allows media to be fed into the left side of the front face of electronic device 110 without obstructing user interface 112. This also acts to minimize paper jams, as the user does not need to disrupt original or recording media in order to enter commands via keypad 114 or view data present on display 116.

Still referring to FIG. 1, depicted are lower paper port 136 and upper paper port 138, which allow a user to input media to the paper handling mechanism of electronic device 110 as discussed in greater detail below with respect to FIGS. 6A through 6F. In the preferred embodiment of the present invention, lower paper port 136 receives original media input by the user (e.g., media to be scanned, faxed, copied, etc.). Similarly, upper paper port 138 receives recording media upon which data is printed during functions such as printing, receiving fax, copying, etc.

The lower and upper paper ports 136 and 138, respectively, are vertically staggered to receive staggered paper feeds, thereby permitting insertion of the original media first in lower paper port 136 followed by the insertion of blank recording media in upper paper port 138. The unique incorporation of two independent, vertically staggered, lower and upper paper ports 136 and 138, respectively, and two independent parallel lower and upper paper paths 622 and 624 (FIG. 6B), respectively, in the small, portable, lightweight device of the present invention further facilitates paper handling and minimizes paper jams.

Furthermore, locating lower and upper paper ports 136 and 138, respectively, at different vertical levels on the same side of electronic device 110 as user interface 112 also provides easy user access and further minimizes paper jams. This location facilitates insertion of two distinct pieces of media for substantially simultaneous scanning and printing (e.g., to perform the copy function) without movement or disruption of electronic device 110 and without obstructing the user's access to user interface 112. This is particularly important in small, portable devices, because jostling the machine during media insertion or movement of the inserted media to access user interface 112 can easily create problems with media alignment, thereby increasing the likelihood of paper jams.

In addition to minimizing paper jams, the same side paper feeds, parallel paths, and simultaneous scanning and printing minimize the required workspace around the unit. For example, if a user wishes to copy a document by placing electronic device 110 on the passenger seat of a vehicle, electronic device 110 may be placed on the seat at a location close to the passenger door. This location allows both the original and recording media to be inserted into electronic device 110, as well as user access to user interface 112. As the simultaneous scanning and printing of the media occurs, the media will progress through electronic device 110 in synchronization as discussed in greater detail below with respect to FIGS. 6A-6F. Therefore, after the copying function is initiated via user interface 112, and as the two pieces of media move in parallel through electronic device 110, the user may simply move electronic device 110 closer to the driver's seat of the vehicle at the same speed at which the media progresses through electronic device 110. Due to the well-designed spatial arrangement of the components discussed above, the effective work area required for copying a document is only slightly larger than the size of the document providing true "on-the-go" performance.

Figure 2:
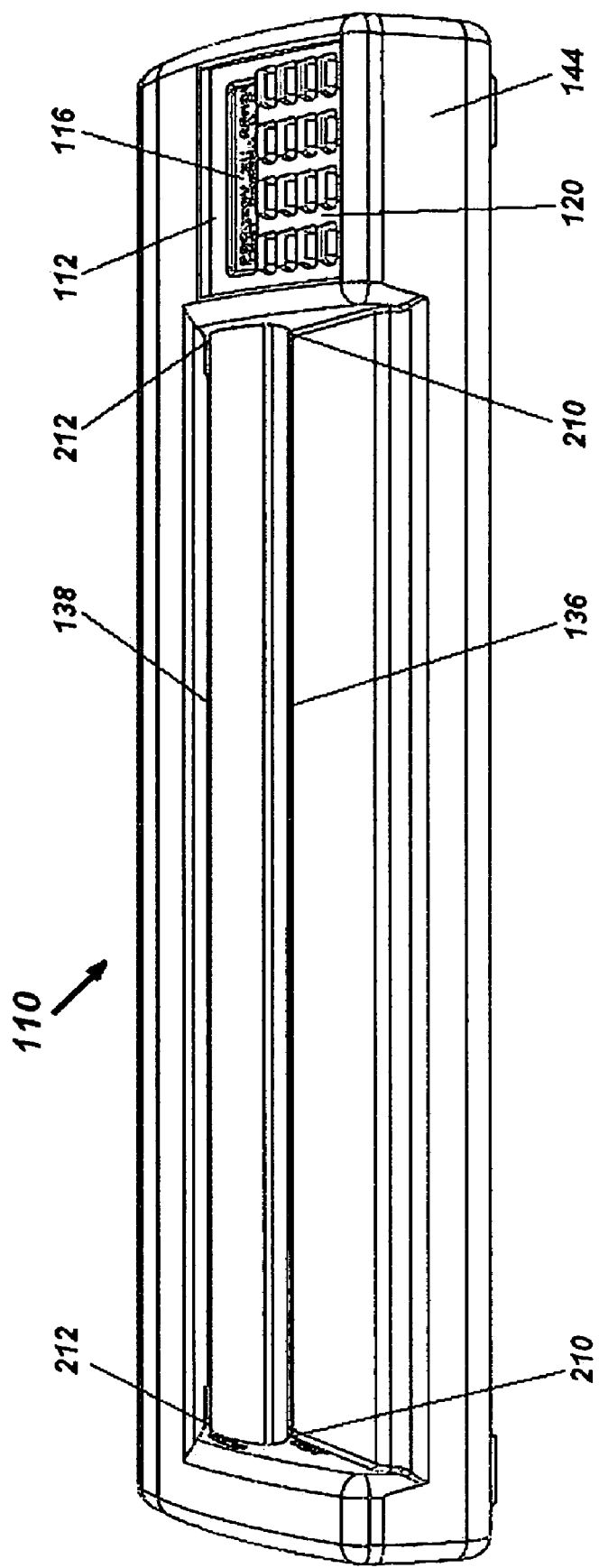
FIG. 2 is a plan view of the front of the portable electronic device shown in FIG. 1 in accordance with the preferred embodiment of the present invention depicting, inter alia, the location of a pair of internal detection sensors for each paper port.

Referring now to FIG. 2, a plan view of the front of electronic device 110 is shown. The ergonomic design of housing 144 allows a user to insert both original media and recording media from the front of electronic device 110 without obstructing any of the components of user interface 112, such as keypad 114 and display 116.

Also depicted in FIG. 2, internal to lower paper port 136 and upper paper port 138, are pairs of lower and upper paper port detection sensors 210 and 212, respectively. Although these lower and upper paper port detection sensors 210 and 212 are not visible from the exterior of housing 144 of electronic device 110, FIG. 2 illustrates the internal location of these sensors when looking at the front of electronic device 110. Although a pair of lower and upper paper port detection sensors 210 and 212, respectively, are shown, only one or more than two detection sensors per paper port could be incorporated without departing from the scope of the present invention.

In the preferred embodiment of the present invention, lower and upper paper port detection sensors 210 and 212, respectively, are infrared optical sensors. Generally, these sensors are strategically positioned to sense the presence of media fed into lower and upper paper ports 136 and 138, respectively, and to provide feedback regarding the alignment and positioning of the media. More specifically, the infrared emitters associated with lower and upper paper port detection sensors 210 and 212 are continually energized, therefore, the associated infrared beams are always energized. However, it should be noted that alternate embodiments are envisioned in which the infrared emitters associated with lower and upper paper port detection sensors 210 and 212 are energized only when required. The preferred embodiment of the present invention chooses the former option, as it is required for the auto-copy function as discussed below with respect to FIG. 12.

When media is properly inserted into lower or upper paper port 136 or 138, respectively, and properly aligned, the media will block transmission of the infrared beam of one or both of lower or upper paper port detection sensors 210 or 212, respectively. When this signal is blocked, the infrared receiver associated with lower or upper paper port detection sensors 210 or 212, respectively, will not sense the infrared beam signal and will output a logical "0" signal. Conversely, when the infrared receiver associated with lower or upper paper port detection sensors 210 or 212, respectively, senses the infrared beam signal, it will output a logical "1" signal.

To determine proper alignment and position of media, the logical outputs of all detection sensors associated with a particular paper port are input to a logical OR function. Therefore, if the infrared receiver associated with any one of lower or upper paper port detection sensors 210 or 212, respectively, senses an infrared beam, the media has not been properly inserted (i.e., not all beams are disrupted). Consequently, the respective lower or upper paper port detection sensor 210 or 212, respectively, outputs a logical "1" signal and the output of the OR function is a "1". Similarly, if the media is properly inserted in the paper port, it will obstruct the infrared beam of all lower or upper paper port detection sensors 210 or 212, respectively, associated with the paper port. Thus, all of the paper port's infrared receivers will not sense their respective infrared beams, and they will all output a logical "0" signal. Only in this condition will the output of the OR function equal "0". This detection sensor circuitry 436 (FIG. 4) then transmits the status of the media (i.e., the output of the OR function) to system controller 412 (FIG. 4) via communication bus 414 (FIG. 4) as discussed below with respect to FIG. 4.

Figure 3:
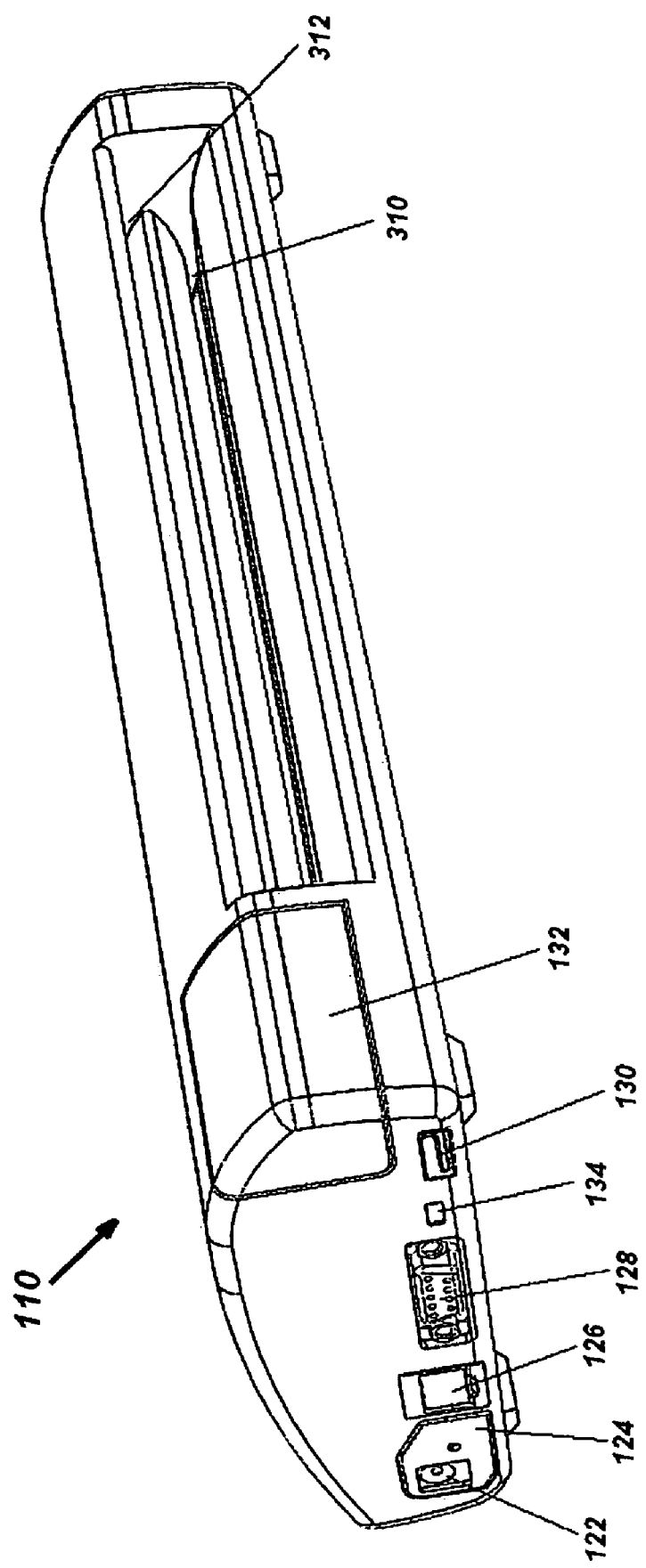
FIG. 3 is a plan view of the right and rear sides of the portable electronic device shown in FIG. 1 in accordance with the preferred embodiment of the present invention depicting its power port and LED indicator, PSTN, RS-232, IrDA®, and USB communications ports, and both right and rear views of a communication module.

Referring next to FIG. 3, a plan view of the right and rear sides of electronic device 110 is shown, specifically illustrating lower and upper paper port rear apertures 310 and 312. Original media is fed into lower paper port 136 located on the front of electronic device 110, as illustrated in FIG. 1, and passes through lower paper path 622 (FIG. 6B) during scanning of the original media. Thereafter, it exits through lower paper port rear aperture 310. Similarly, recording media is fed into upper paper port 138 also located on the front of electronic device 110 as illustrated in FIG. 1, and passes through upper paper path 624 (FIG. 6B) during scanning of the original media. Thereafter, it exits through upper paper port rear aperture 312.

Locating the input and discharge ports for each of lower and upper paper paths 622 and 624 (FIG. 6B), respectively, on opposite sides of electronic device 110 further minimizes the potential for paper jams, especially during performance of simultaneous functions. For example, if a user wishes to perform sequential fax and print functions, the user first inputs original media in lower paper port 136, dials the destination fax number, and commands electronic device 110 via user interface 112 to transmit the fax. Immediately thereafter, while the original media continues to move through lower paper path 622 (FIG. 6B), the user may immediately insert recording media into upper paper port 138 and initiate the print function without danger of disrupting the flow of the original media through lower paper path 622 (FIG. 6B).

Also depicted in FIG. 3 is the entire accessory module 132, specifically illustrating its size and location with respect to the other external components of electronic device 110. In particular, the ergonomically designed locations of accessory module 132, as well as power port 122, power module 124, PSTN port 126, RS-232 port 128, USB port 130, and IrDA® port 134, provide convenient access to these ports and modules, while still reducing the potential physical interference between original and recording media traveling through electronic device 110 and these ports and modules, including any cables or devices connected thereto. Interference of these ports or modules and any associated devices with user interface 112 is also minimized.

Figure 4:
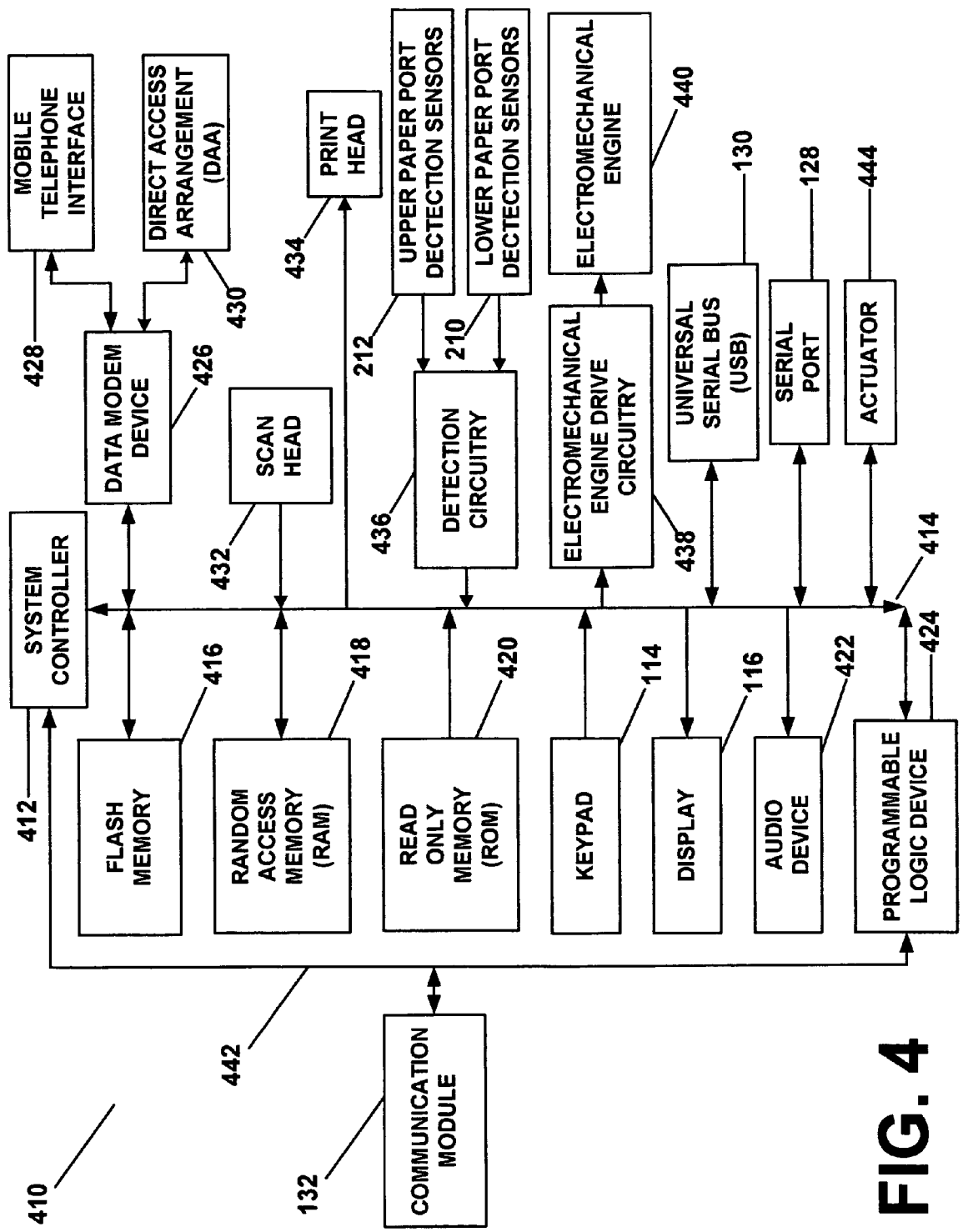
FIG. 4 is a block diagram of the control subsystem of the portable electronic device shown in FIG. 1 in accordance with the preferred embodiment of the present invention.

Referring next to FIG. 4, depicted is a schematic view of control subsystem 410. In the preferred embodiment of the present invention, the heart of control subsystem 410 is system controller 412, which is a Motorola® MC9328MX1 integrated portable system processor. However, it should be noted that various other electronic components or a combination of electronic components including, but not limited to, processors fabricated by manufacturers other than Motorola®, programmable logic controllers, etc. may be employed without departing from the scope of the present invention.

Consequently, in the preferred embodiment of the present invention, system controller 412 is a single, 256-pin integrated circuit ("IC") chip that includes, inter alias a central processing unit ("CPU"), an eleven (11) channel direct memory access ("DMA") controller, a synchronous dynamic random access memory ("SDRAM") controller, one hundred twenty eight (128) kilobytes random access memory ("RAM"), a Joint Test Action Group ("JTAG®") in-circuit emulator ("ICE") port, a bootstrap loader, general purpose input/output ("I/O") ports, a pulse width modulator, timers, a real time clock ("RTC"), and a watchdog timer. Furthermore, system controller 412 facilitates connection to standard, commonly used peripherals via its on-chip memory stick host controller, two (2) Universal Asynchronous Receiver Transmitters ("UARTS"), two (2) service provider interface ("SPI") ports, small-scale integration ("SSI/I$^2$S") port, I$^2$C port, USB port, Smartcard interface, Bluetooth® accelerator, analog signal processor, LCD controller, video port, and multimedia accelerator.

Non-volatile data storage is accomplished within control subsystem 410 via flash memory 416. The types of data stored in flash memory 416 include application-specific programs (e.g., the auto-sensing algorithm, the print algorithm, the copy algorithm, etc.) and user data (e.g., received and sent fax data, scanned data, electronic mail, saved web pages, data to be printed, etc.), but do not include local "scratchpad" data storage (e.g., print power management algorithm calculation results such as quantity of pixels to be burned simultaneously, application program "stack" and interrupt pending data, real time calculations, fax number being dialed, etc.). The latter is stored within the on-chip memory of system controller 412. In the preferred embodiment of the present invention, flash memory 416 is an expandable, modular Not And ("NAND") flash memory, having a minimum of eight (8) megabytes of storage and implemented with a Spansion® AM30LV0064D 32 Megabit memory IC.

Flash memory 416 communicates with system controller 412 and the other elements of control subsystem 410, as described in greater detail below, via communication bus 414. Various types of information are sent via communication bus 414 including data, addresses, control information, etc. Communication bus 414 may be a single communication bus or multiple communication buses without departing from the scope of this invention. Also, although the preferred embodiment of the present invention incorporates flash memory 416, the present invention is not so limited. Other forms of memory may be substituted for flash memory 416 such as Smartcard, SmartMedia®, Dual In-Line Memory Modules ("DIMMs"), Single In-Line Memory Modules ("SIMMs"), etc. without departing from the scope of the present invention.

Data is transferred to flash memory 416 via communication bus 414, whereupon it is loaded into flash memory 416 via an integral bootstrap loader. The latter is discussed in detail below with respect to FIG. 7. Flash memory 416 is also designed to support remote field updates (i.e., updates transmitted to electronic device 110 from a remote location via a long-distance communication means such as a PSTN line, Internet connection, etc.) to the application specific firmware, as discussed in detail below with respect to FIGS. 7 through 15, of electronic device 110.

Control subsystem 410 also includes RAM 418. RAM 418 consumes less power than flash memory 416, but cannot be used for storage of critical data since RAM 418 loses its data upon a loss of power. Therefore, RAM 418 is included to reduce the overall power consumption of electronic device 110, but must be used in conjunction with flash memory 416 to preserve the integrity of critical data.

In addition to RAM 418, control subsystem 410 includes read only memory ("ROM") 420. Data that will never require modification or upgrade (e.g., serial number data) will be stored in ROM 420. In addition, ROM 420 will store special boot loader firmware to address bootloads other than those already handled by system controller 412.

Also included within control subsystem 410 is programmable logic device ("PLD") 424. Generally, this device supports system controller 412 by performing some of the functions that could be alternatively performed by system controller 412 such as low level address decoding, interrupt multiplexing, detecting and identifying accessory module 132, etc. In addition, inclusion of PLD 424 adds the flexibility of performing software upgrades without requiring a re-configuration of the printed circuit board containing system controller 412. This method of upgrading software allows production changes to occur after initial sales of the electronic device 110 have occurred without recall of sold devices.

More specifically, PLD 424 of the preferred embodiment of the present invention is a Xilinx® CoolRunner®XPLA3. PLD 424 executes the control code for operation of keypad 114, display 116, motor 440, lower and upper paper port detection sensors 210 and 212, respectively, lower and upper paper port roller gears 614 and 616, respectively, and accessory module bus 442. For example, PLD 424 is responsible for scanning keypad 114, communicating data between electronic device 110 and accessory modules 132 via accessory module bus 442, interfacing to display 116, and detecting paper in each of lower and upper paper ports 136 and 138, respectively.

Scanning of keypad 114 includes de-bounce controls. That is, circuitry within PLD 424 reduces the chatter associated with the switching of contacts in response to a user pushing a button on keypad 114. This de-bounce circuitry reduces the chatter and provides a single, clean change of state to system controller 412 via communication bus 414.

PLD 424 is also responsible for automatically detecting and identifying an accessory module 132 present in accessory module bay 142 (FIG. 1). Accessory module bus 442 is separate and distinct from communication bus 414, and is jointly derived from both system controller 412 and PLD 424. Accessory module bus 442 interfaces to accessory module 132 whenever the latter is present in accessory module bay 142 (FIG. 1) via a multi-pin connector and/or a cable interconnect. In the preferred embodiment of the present invention, at least five (5) pins of the multi-pin connector are dedicated to automatic identification of the specific accessory module 132 plugged into accessory module bay 142. However, lesser or greater quantities of pins dedicated to this purpose may be implemented without departing from the scope of the present invention.

In the preferred embodiment of the present invention, five pins are connected to a 3.3 volt source through five (5) individual pullup resistors (i.e., each pin has a dedicated pullup resistor) having a value of 100 KiloOhms or greater. The relatively large size of the pullup resistors minimizes battery drain, as the higher resistance causes a lower current draw from the battery. The side of each resistor connected to the 3.3 volt source shall be referred to as the "high side", and the opposite end of each resistor shall be referred to as the "low side". The low side of each resistor is connected to one of the five (5) pins of the multi-pin connector as well as one of five (5) dedicated pins of PLD 424.

Each type of accessory module 132 (e.g., Bluetooth®, GPRS, 802.11, Ethernet, UWB, etc.) shall include a connector having a unique pin that creates a ground connection to one, and only one, of the five (5) pullup resistors. For example, a Bluetooth® accessory module 132 shall ground the first of the five (5) pullup resistors. Similarly, an 802.11 accessory module 132 shall ground the second of the five (5) pullup resistors. Likewise, a UWB accessory module 132 shall ground the third of the five (5) pullup resistors. Additional spare pins are provided in the present invention to accommodate new technologies that are either not yet invented or not yet widely used.

Each low side of the pullup resistors is connected to PLD 424 to allow monitoring of the low sides to determine whether an accessory module 132 is present and, if yes, its communication protocol. After accessory module 132 is automatically detected and its communication protocol is determined, PLD 424 communicates this information to system controller 412. In response, system controller 412 selects the corresponding application firmware, which resides in flash memory 416, and copies it to RAM 418. This allows the driver code that corresponds to the communication protocol of the inserted accessory module 132 to be executed such that electronic device 110 may interface with accessory module 132.

Still referring to FIG. 4, data modem device 426, mobile telephone interface 428, and Direct Access Arrangement ("DAA") 430 work together to enable the wireless faxing capabilities of electronic device 110. More specifically, mobile telephone interface 428 allows a wide variety of mobile telephones (e.g., cellular telephones) to be physically connected to data modem device 426, by providing a cable or other type of interface that has ports compatible with both data modem device 426 and the specific mobile telephone to be used with electronic device 110. In addition, data modem device 426 and Direct Access Arrangement ("DAA") 430 of the preferred embodiment of the present invention are a Conexant® CX81801 data modem device and a Conexant® CX20493 SmartDAA®, respectively. Although more expensive, the preferred embodiment incorporates DAA 430 to allow data modem device 426 to support the universal DAA communication protocol, which is required in some areas of the worldwide marketplace to meet varying regulatory standards. However, less expensive, alternate embodiments of the present invention are also envisioned with alternate data modem devices 426 such as a LiteLink® from CP Clare or a Conexant® FF336Plus IC.

Furthermore, scan head 432 and print head 434 (see FIG. 6B for plan view) are also coupled to system controller 412 and the PLD 424 via communication bus 414 and are controlled by control subsystem 410 as discussed below with respect to FIGS. 11 through 15.

In the preferred embodiment of the present invention, scan head 432 is a commercially available, color, optical scan head such as those manufactured by Rohm® or Dyna Image®. The data acquired by scan head 432 is converted from analog to digital data with 8 bits of resolution via the low cost National Semiconductor® ADC08061 IC, which includes an integral input multiplexer and sample and hold. An external adjustable band gap reference, such as the Texas Instruments® TLE2431, is also included to provide a stable, accurate reference voltage for full-scale logic values. Zero offset calibration is accomplished via software. Scan head 432 of the preferred embodiment of the present invention allows electronic device 110 to scan color media and transmit the color digital data to other color-equipped devices such as color fax machines, PCs, PDAs, etc.

As an alternative to scan head 432 of the preferred embodiment of the present invention, a pure digital scan head may be implemented. Although this type of scan head is more expensive and would result in a more costly electronic device 110, it simplifies the design as the pure digital scan head includes an integral analog-to-digital ("A/D") converter and associated electronics.

In yet another alternative embodiment, gray-scale optical scanning is incorporated, even though only black and white local printing is supported by print head 434 in the low cost version of the preferred embodiment of the present invention. However, scan heads other than those discussed above, may be incorporated without departing from the scope of the present invention. Or, in yet another alternate embodiment, scan head 432, and consequently the scanning function, may be removed from electronic device 110 to create a lower cost version of the present invention.

Preferably, print head 434 is a commercially available, thermal print head. However, higher cost versions of electronic device 110 are envisioned that are equipped with color print heads.

Lower paper port detection sensors 210 and upper paper port detection sensors 212 are also coupled to system controller 412 and PLD 424 via communication bus 414 via detection sensor circuitry 436. Generally, detection sensor circuitry 436 provides validation information regarding the position and alignment of media fed into lower and upper paper ports 136 and 138, respectively, to control subsystem 410. More specifically, control subsystem 410 receives the outputs of the OR functions (i.e., one OR function per paper port), as discussed above with respect to FIG. 2, from detection sensor circuitry 436 to validate the position and alignment of media present in lower and upper paper ports 136 and 138, respectively. This detection sensor circuitry 436 transmits the outputs of the OR functions to PLD 424 via communication bus 414 as an interrupt. However, alternatively, detection sensor circuitry 436 may also transmit the interrupt directly to system controller 412. In yet another alternate embodiment, system controller 412 or PLD 424 may poll detection sensor circuitry 436 at regular intervals in lieu of transmitting an interrupt.

This position and alignment data is processed by control subsystem 410, whereupon it is used to synchronize the scanning and printing processes during copying via control of mechanical trigger 626. Mechanical trigger 626 is described below in greater detail with respect to FIGS. 6C through 6F. Furthermore, this position and alignment data is processed by control subsystem 410 to initiate the auto-copy function, discussed below with respect to FIG. 12, when detection sensor circuitry 436 detects the presence of paper in lower paper port 136.

Still referring to FIG. 4, electromechanical engine drive circuitry 438 interfaces motor 440 to system controller 412 and PLD 424 via communication bus 414. In accordance with the preferred embodiment of the present invention, motor 440 is a two-phase unipolar stepper motor. To maintain the low cost of the present invention, electromechanical engine drive circuitry 438 is a simple H-Bridge configured motor drive circuit (e.g., an Allegro® A3966 dual full-bridge pulse width modulated motor driver).

Alternatively, more complex and more expensive alternate embodiments may be incorporated without departing from the scope of the present invention. For example, a higher cost model is envisioned wherein electromechanical engine drive circuitry 438 is an Allegro® SLA7042 power multi-chip module capable of controlling motor 440 using micro-stepping techniques. These techniques provide improved resolution without limiting step rates, as well as smoother low-speed motor operation.

Figure 5:
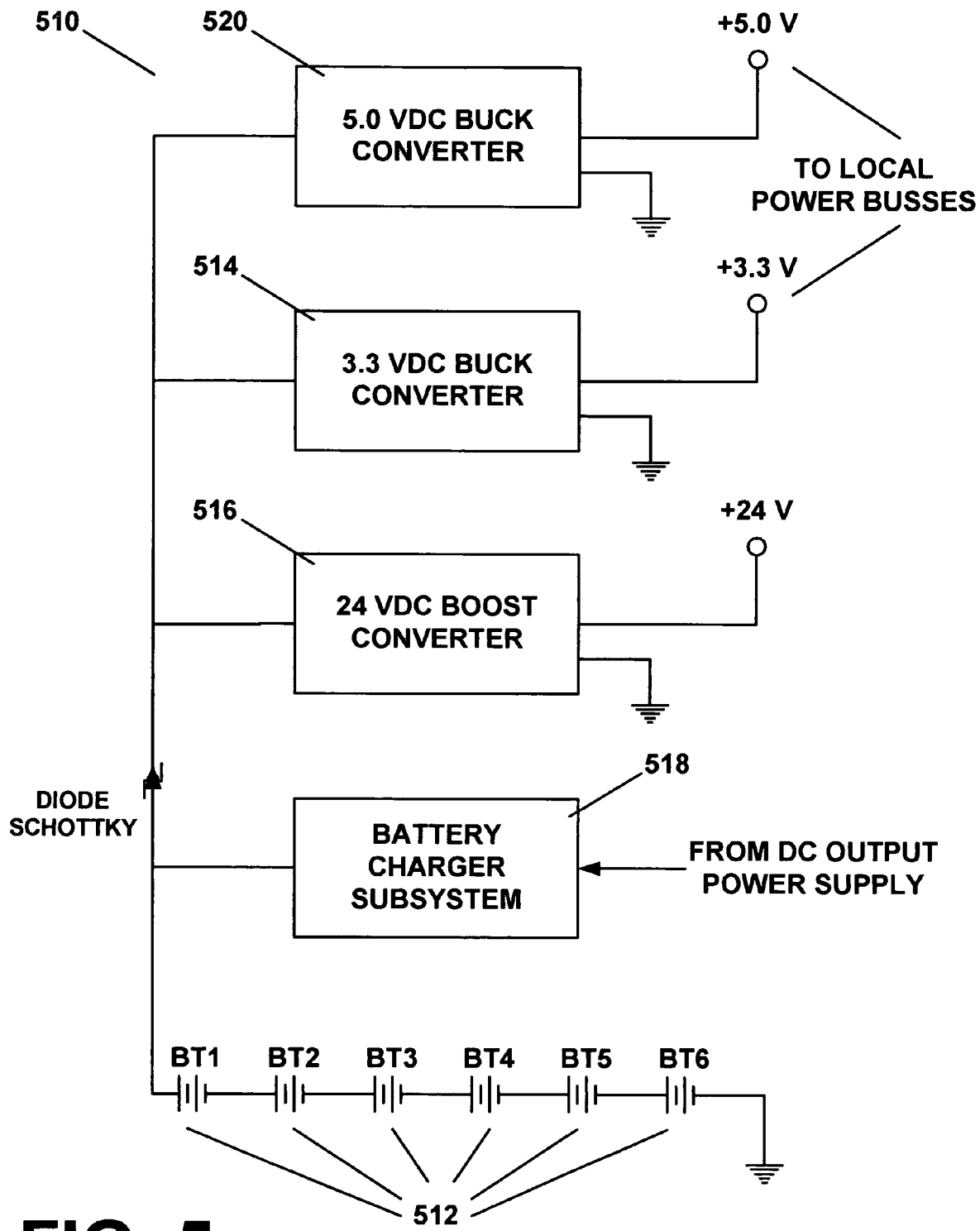
FIG. 5 is a block diagram of the power management subsystem of the portable electronic device shown in FIG. 1 in accordance with the preferred embodiment of the present invention.

Turning now to FIG. 5, depicted is the power management subsystem 510 of electronic device 110 according to the preferred embodiment of the present invention. Power management subsystem 510 recharges batteries 512 and actively manages the power supplied to all electronic and electromechanical components of electronic device 110. In the preferred embodiment, the core of power management subsystem 510 is a stack of six (6) Sanyo® 4/5AU rechargeable batteries 512 having a nominal capacity of 2150 milliamps per hour. At full charge, batteries 512 have a stack voltage of 8.4 volts. 3.3 volt DC buck converter 514 provides a supply voltage of 3.3 volts to the on-board logic circuitry. Similarly, 5.0 volt DC buck converter 520 provides a supply voltage of 5.0 volts for future components (e.g., future communication modules) requiring a 5.0 volt DC power supply in lieu of a 3.3 volt DC power supply. 24 volt DC boost converter 516 generates a nominal 24-volt DC drive voltage for print head 434.

Power management subsystem 510 also includes battery charger subsystem 518. In accordance with the preferred embodiment of the present invention, battery charger subsystem 518 is a Texas Instruments® BQ2000T Fast Charge management IC, however, alternate battery charger systems may be incorporated without departing from the scope of the present invention. A universal, UL-approved, AC input DC power supply charges batteries 512 and supplies power to electronic device 110 whenever AC power is available. Alternatively, DC power may be supplied to electronic device 110 via a cigarette lighter adapter or airplane adapter.

Special precautions are taken to synchronize the oscillator frequencies to a single value to minimize the need for additional filtering. These special precautions include the use of a common or synchronized clock frequency, or a divided multiple thereof, to minimize the quantity of fast rising edge clock signals that occur in the circuitry of electronic device 110. Also, a minimum quantity of separate crystals or clock oscillators will be incorporated, and the clock frequency shall be multiplexed in all possible instances. These precautions enable electronic device 110 to comply with the electromagnetic ("EMI") and radio frequency interference ("RFI") regulations promulgated by the Federal Communications Commission ("FCC")(i.e., Part 15 unintentional radiation limits) and the European Community.

Figure 6A:
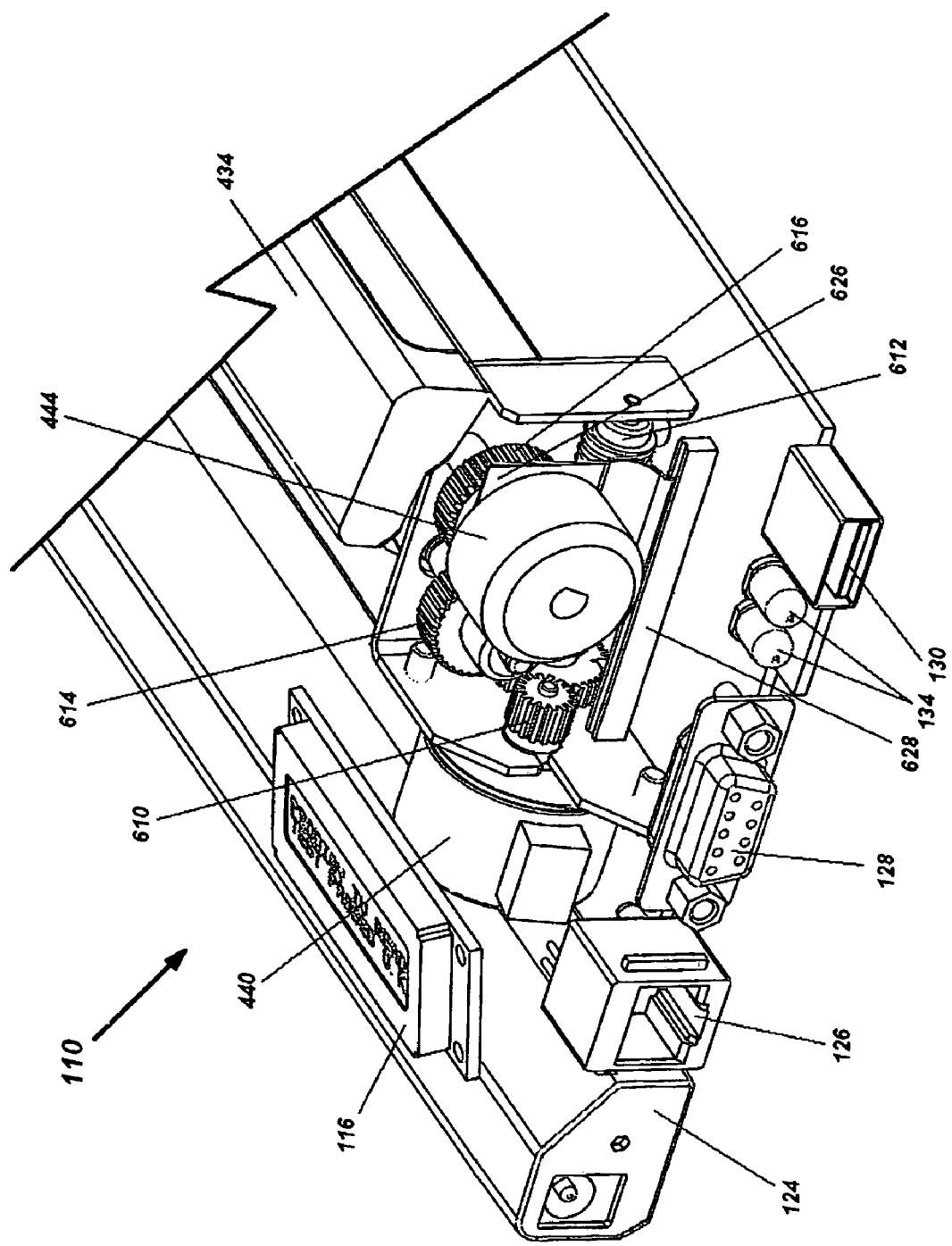
FIG. 6A is a plan view of the electromechanical engine including main motor drive gear, pinion gear, lower paper port roller gear, upper paper port roller gear, actuator, and mechanical trigger of the portable electronic device shown in FIG. 1 in accordance with the preferred embodiment of the present invention from a right, rear angle and illustrating the physical location of these elements relative to each other and some of the exterior components of the portable electronic device including the display, power module, PSTN port, RS-232 port, IrDA port, and USB port.
Figure 6B:
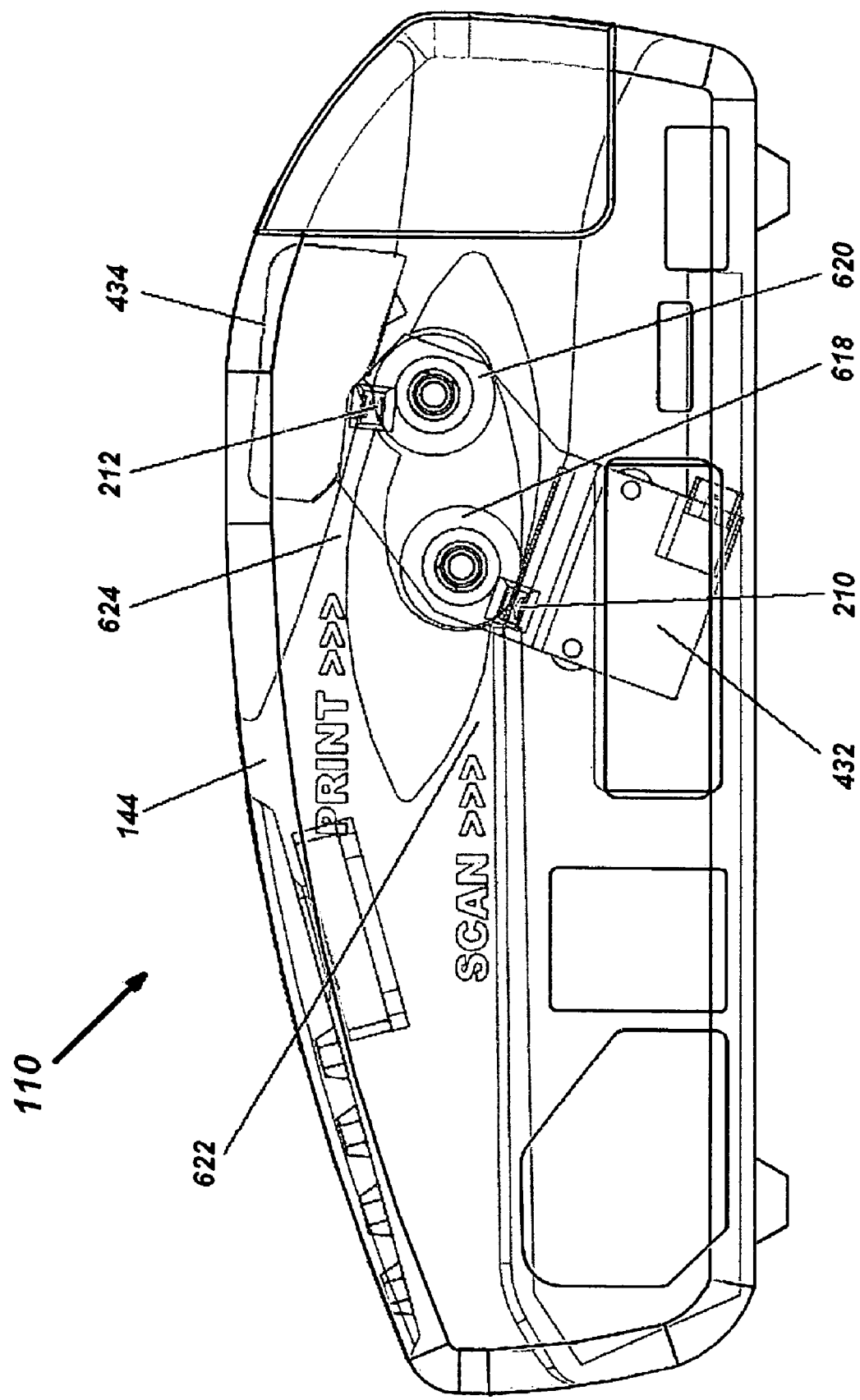
FIG. 6B is a right side, plan view of the scan head, print head, lower and upper paper port rollers, and upper and lower paper paths located internal to the portable electronic device shown in FIG. 1 in accordance with the preferred embodiment of the present invention.

Referring now to FIG. 6A, motor 440 of the preferred embodiment of the present invention is depicted in relation to some of the exterior components of electronic device 110 including display 116, power module 124, PSTN port 126, RS-232 port 128, and USB port 130. For clarity, all other interior portions of these components, as well as other interior components, have been omitted.

Under the direction of control subsystem 410 (FIG. 4), motor 440 receives electrical power from power management subsystem 510 and converts it from electrical energy to mechanical energy by driving main motor drive gear 610, which in turn drives pinion gear 612. Pinion gear 612 drives one or both of lower and upper paper port roller gears 614 and 616, respectively, based upon the requirements of the functions being performed by electronic device 110 and the position of mechanical trigger 626. This rotational energy translates to lower and upper paper port rollers 618 and 620 (FIGS. 6B-6D), respectively, moving media fed into lower and upper paper ports 136 and 138, respectively, through independent lower and upper paper paths 622 and 624 (FIG. 6B), respectively, and exiting electronic device 110 via lower and upper paper port rear apertures 310 and 312, respectively (FIG. 3). Alternate, more detailed views of lower paper port roller gear 614, upper paper port roller gear 616, pinion gear 612, and main motor drive gear 610 are illustrated in and discussed below with respect to FIGS. 6C through 6F.

Mechanical trigger 626, controlled by actuator 444, maintains upper paper port roller gear 616 in one of two positions with respect to lower paper port roller gear 614 without the need for continuous power. In accordance with the preferred embodiment of the present invention, mechanical trigger 626 is a spring leaf mounted under compression between support 628 (FIGS. 6C-6F) and actuator 444.

When electronic device 110 is first powered on, system controller 412 will drive actuator 444 towards the right side of electronic device 110 such that upper paper port roller gear 616 is no longer engaged with lower paper port roller gear 614. More specifically, a temporary power pulse of the appropriate polarity (i.e., the disengage polarity) is applied to actuator 444 via the proper "H" set of power drivers (i.e., the disengage set of power drivers). If upper paper port roller gear 616 is in the disengaged position with respect to lower paper port roller gear 614 upon power up, its position will not be altered. If not, actuator 444 will pull mechanical trigger 626 towards the right side of electronic device 110 to a distance at which mechanical trigger 626 exceeds its maximum compression point causing the spring force of mechanical trigger 626 to move upper paper port roller gear 616 away from lower paper port roller gear 614 until it is completely disengaged from lower paper port roller gear 614.

Similarly, when control subsystem 410 desires to engage upper paper port roller gear 616 with lower paper port roller gear 614 (e.g., during the copy process), system controller 412 applies a temporary power pulse having the opposite polarity of the disengaged power pulse discussed above by inverting and activating the H-bridge power drivers. The temporary power pulse moves actuator 444 toward the left side of electronic device 110 to a distance at which mechanical trigger 626 exceeds its maximum compression point causing the spring force of mechanical trigger 626 to move upper paper port roller gear 616 toward lower paper port roller gear 614 until it is fully engaged with lower paper port roller gear 614.

Figure 6C:
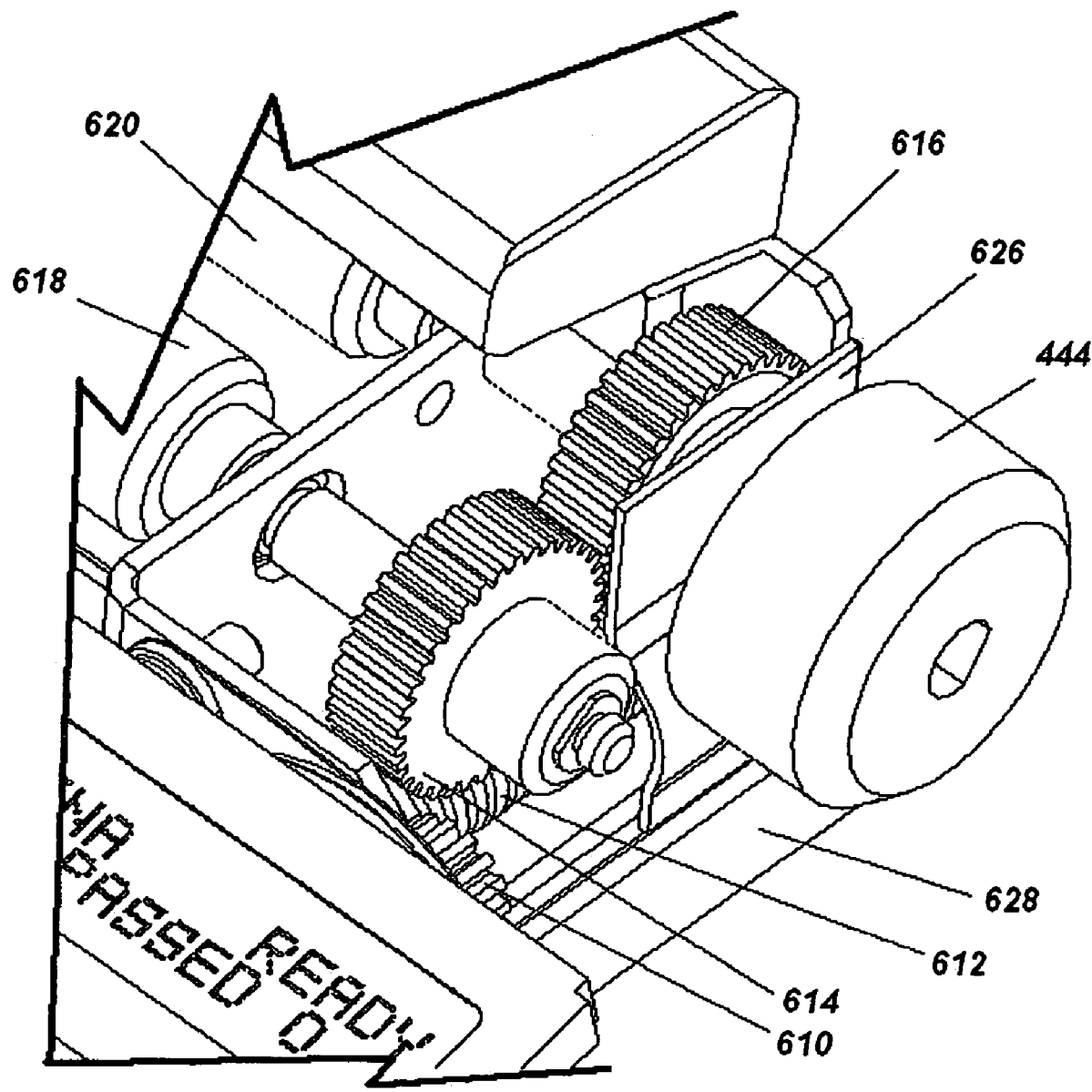
FIG. 6C is an isometric plan view of the top, right sides of the upper and lower paper port rollers shown in FIG. 6B in accordance with the preferred embodiment of the present invention illustrating the upper paper port roller gear in an engaged position with respect to the lower paper port roller gear, attachment of the upper and lower paper port roller gears to their respective paper port rollers, and coupling of the actuator and mechanical trigger to the upper paper port roller gear.
Figure 6D:
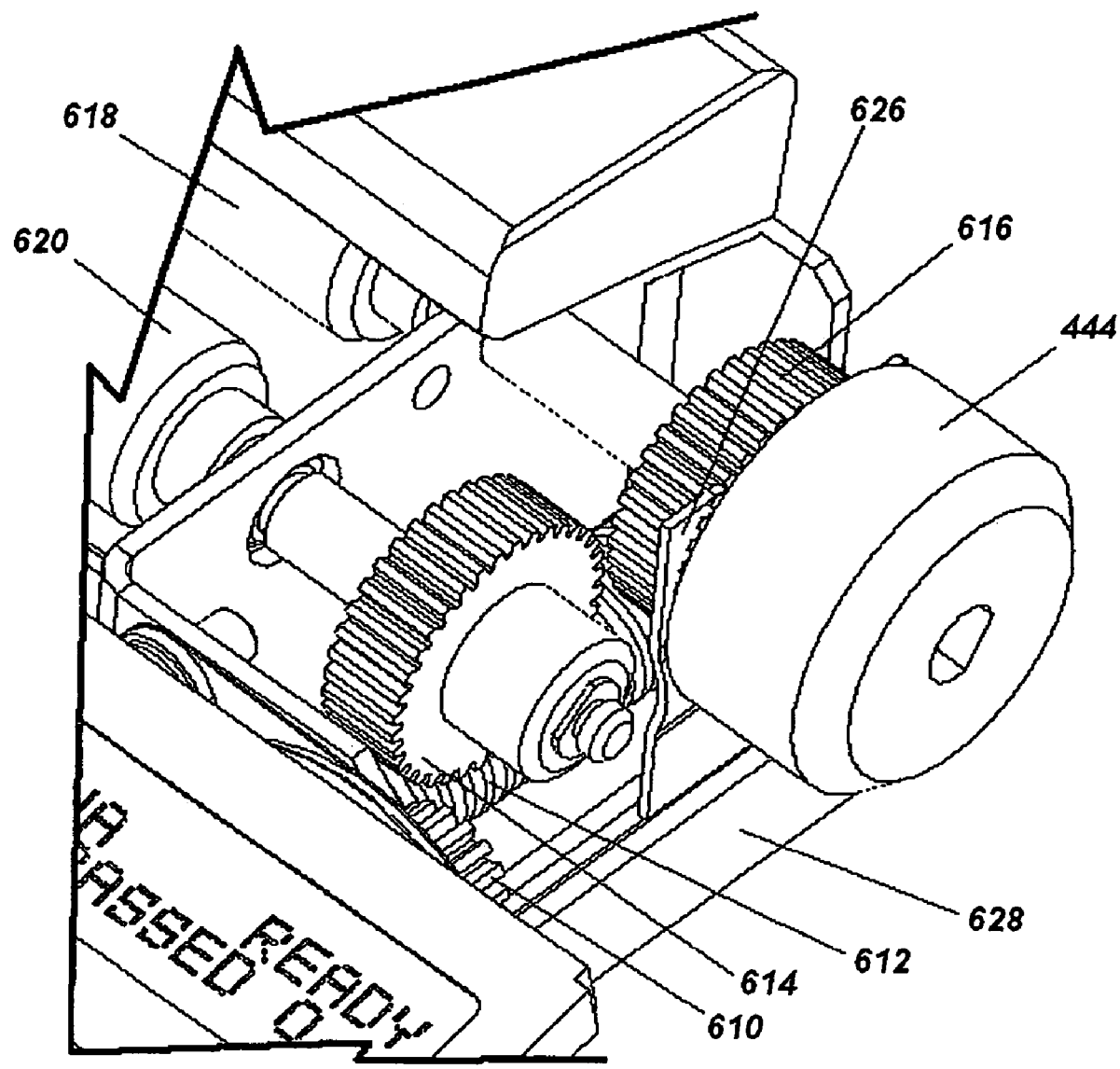
FIG. 6D is an isometric plan view of the top, right sides of the upper and lower paper port rollers shown in FIG. 6B in accordance with the preferred embodiment of the present invention illustrating the upper paper port roller gear in a disengaged position with respect to the lower paper port roller gear, attachment of the upper and lower paper port roller gears to their respective paper port rollers, and coupling of the actuator and mechanical trigger to the upper paper port roller gear.

Upper paper port roller gear 616 is disengaged from lower paper port roller gear 614 during the scanning function. This function, which is intrinsic to the scanning, copying, and faxing operations, is implemented using the same techniques described below for the printing function. However, the scanning operation occurs using its own dedicated, independent elements including lower paper port 136 (FIG. 1), a pair of lower paper port detection sensors 210 (FIG. 2), lower paper path 622 (FIG. 6B), and lower paper port roller 618 (FIGS. 6B-6D).

At the onset of a scanning operation, the original media is inserted into lower paper port 136 (FIG. 1). When lower paper port detection sensors 210 (FIG. 2) sense the proper alignment and positioning of the recording media, detection sensor circuitry 436 (FIG. 4) transmits a signal to control subsystem 410 (FIG. 4), as discussed in detail above with respect to FIG. 4. Upon validation that the original media has been properly inserted in lower paper port 136 (FIG. 1), control subsystem 410 transmits a temporary power pulse to actuator 444 to index lower paper port roller gear 614 to disengage from lower paper port roller gear 614. Thereafter, control subsystem 410 (FIG. 4) activates motor 440 (FIG. 4) causing main drive motor gear 610 to rotate, which in turn rotates pinion gear 612, which in turn rotates lower paper port roller gear 614 only.

Upper paper port roller gear 616 does not rotate as it is disengaged from lower paper port roller gear 614. Disengaging upper paper port roller gear 616 from lower paper port roller gear 614 conserves power, which is extremely important during battery operation. The original media passes through its dedicated lower paper path 622 in close contact with scan head 432, whereupon the image data is scanned by scan head 432 on a line-by-line basis. As each line is scanned, the original media progressively passes through its dedicated lower paper path 622 (FIG. 6B) and exits electronic device 110 (FIG. 1) via lower paper port rear aperture 310 (FIG. 3).

In contrast, upper paper port roller gear 616 is engaged with lower paper port roller gear 614 during the printing function. To print a document, first, the recording media is inserted into upper paper port 138 (FIG. 1). When upper paper port detection sensors 212 (FIG. 2) sense the proper alignment and positioning of the recording media against the upper paper port roller 620 (FIGS. 6B-6D), detection sensor circuitry 436 (FIG. 4) transmits a signal to control subsystem 410 (FIG. 4), as discussed in detail above with respect to FIG. 4. In response, control subsystem 410 transmits a temporary power pulse to actuator 444 to index upper paper port roller gear 616 to engage with lower paper port roller gear 614.

Thereafter, control subsystem 410 activates motor 440 (FIG. 4) via electromechanical engine drive circuitry 438 to rotate main drive motor gear 610, which in turn rotates pinion gear 612, which in turn rotates both the lower paper port roller gear 614 and the upper paper port roller gear 616. The paper is then conveyed by the upper paper port roller 620 (FIGS. 6B-6D) in tight contact with print head 434, whereupon the data is printed by print head 434 on the recording media on a line-by-line basis. As each line is printed, the recording media progressively passes through its dedicated upper paper path 624 (FIG. 6B) and exits electronic device 110 (FIG. 1) via upper paper port rear aperture 312 (FIG. 3).

Upper paper port roller gear 616 is also engaged with lower paper port roller gear 614 during the copying function. When a copying function is to be performed by electronic device 110, the original media is first inserted into upper paper port 138 (FIG. 1). Upper paper port detection sensors 212 allow the upper paper port roller 620 (FIGS. 6B-6D) to advance the original media through upper paper path 624 (FIG. 6B) only until the first line of the image is read, at which point the upper paper port roller 620 (FIGS. 6B-6D) stops rotating, under the direction of control subsystem 410, to wait for the insertion of the recording media into lower paper port 136. When the lower paper port detection sensors 210 sense that the recording media is properly positioned and aligned, control subsystem 410 transmits a temporary power pulse to actuator 444 to engage upper paper port roller gear 616 with lower paper port roller gear 614. Thereafter, motor 440 drives both lower and upper paper port rollers 618 and 620, respectively, thereby providing optimum synchronization of the scanning and printing functions.

Electronic device 110 performs a true copying function. That is, electronic device 110 prints the data scanned from the media to be copied virtually simultaneously with scanning. Due to the unique design of electronic device 110 including, but not limited to, the incorporation of two independent rollers and two independent paper paths, it is not necessary to wait until the document to be copied is scanned to memory to free up a roller and/or paper path to perform printing of the scanned data.

An alternate embodiment of the present invention is envisioned that includes a second electromechanical engine including a second motor, a second main motor drive gear, and a second pinion gear. In this alternate embodiment, motor 440 drives main drive gear 610, which in turn drives pinion gear 612, which in turn drives only lower paper port roller gear 614. Actuator 444 and mechanical trigger 626 are eliminated in this embodiment, and upper paper port roller gear 616 no longer engages with lower paper port roller gear 614. Rather, when upper paper port roller gear 616 must be rotated, the second motor drives the second main drive gear, which drives the second pinion gear, which is continually engaged with upper paper port roller gear 616.

The inclusion of a dedicated motor, main motor drive gear, and pinion gear for each of lower and upper paper port rollers 618 and 620, respectively, provides truly independent rotation of each roller and, therefore, provides greater flexibility when using the device. For example, since the scanning and printing functions are completely independent, a user may print a first document while simultaneously faxing a second document, thereby decreasing the time required to process the two tasks and increasing user productivity.

Referring now to FIG. 6B, depicted is a side view of the components internal to housing 144 of electronic device 110 illustrating two independent paper paths, namely lower paper path 622 and upper paper path 624. The present invention advantageously utilizes two different lower and upper paper port rollers 618 and 620, respectively, to move the original and recording media past scan and print heads 432 and 434, respectively. The original and recording media passes through lower paper path 622 and upper paper path 624, respectively, whereupon the media exits electronic device 110 via lower and upper paper port rear apertures 310 and 312, respectively (FIG. 3). In the preferred embodiment of the present invention, rotation of upper paper port roller 620 is individually controlled by control subsystem 410 via engagement or disengagement of upper paper port roller gear 616 with lower paper port roller gear 614. Alternatively, in accordance with the double electromechanical engine alternate embodiment discussed above, any one or both lower and upper paper port rollers 618 and 620 may be active at any given time, as required by the type of function(s) being performed. In either scenario, the use of independent lower and upper paper port rollers 618 and 620, respectively, provides for virtually jam-free operation since the recording and original media travel through completely independent lower and upper paper paths 622 and 624 (i.e., the recording and original media do not share a common path).

Referring next to FIGS. 6C and 6D, depicted is an isometric plan view of the top and front of upper paper port roller gear 616 in an engaged and disengaged position, respectively, with respect to lower paper port roller gear 614. As discussed above with respect to FIG. 6A, paper synchronization and printing is achieved by providing a temporary power pulse to actuator 444 such that actuator 444 applies pressure to mechanical trigger 626 until a maximum compression point is exceeded. Mechanical trigger 626 then forces upper paper port roller gear 616 to engage with lower paper port roller gear 614. In the engaged state, pinion gear 612 drives both lower and upper paper port roller gears 614 and 616, respectively, providing printing as well as synchronization between the printing and scanning functions.

Relying on the mechanical spring action of mechanical trigger 626 to drive upper paper port roller gear 616 to the engaged or disengaged position eliminates the need for a continuous electrical signal to upper paper port roller gear 616, thereby minimizing the power consumed by electronic device 110. If the engagement of upper paper port roller gear 616 must be sustained by continuously energizing a solenoid, as is commonly performed in the art, its continuous power consumption drastically reduces the length of time that electronic device 110 may operate on battery power without recharging. This reduction in use would severely limit the portability of electronic device 110, as the device will require more frequent recharging. Therefore, advantageously, the design of electronic device 110 is designed to supply a temporary low voltage, low current power pulse to temporarily modify the position of mechanical trigger 626 until its mechanical spring action changes the position of upper paper port roller gear 616 with respect to lower paper port roller gear 614.

Figure 6E:
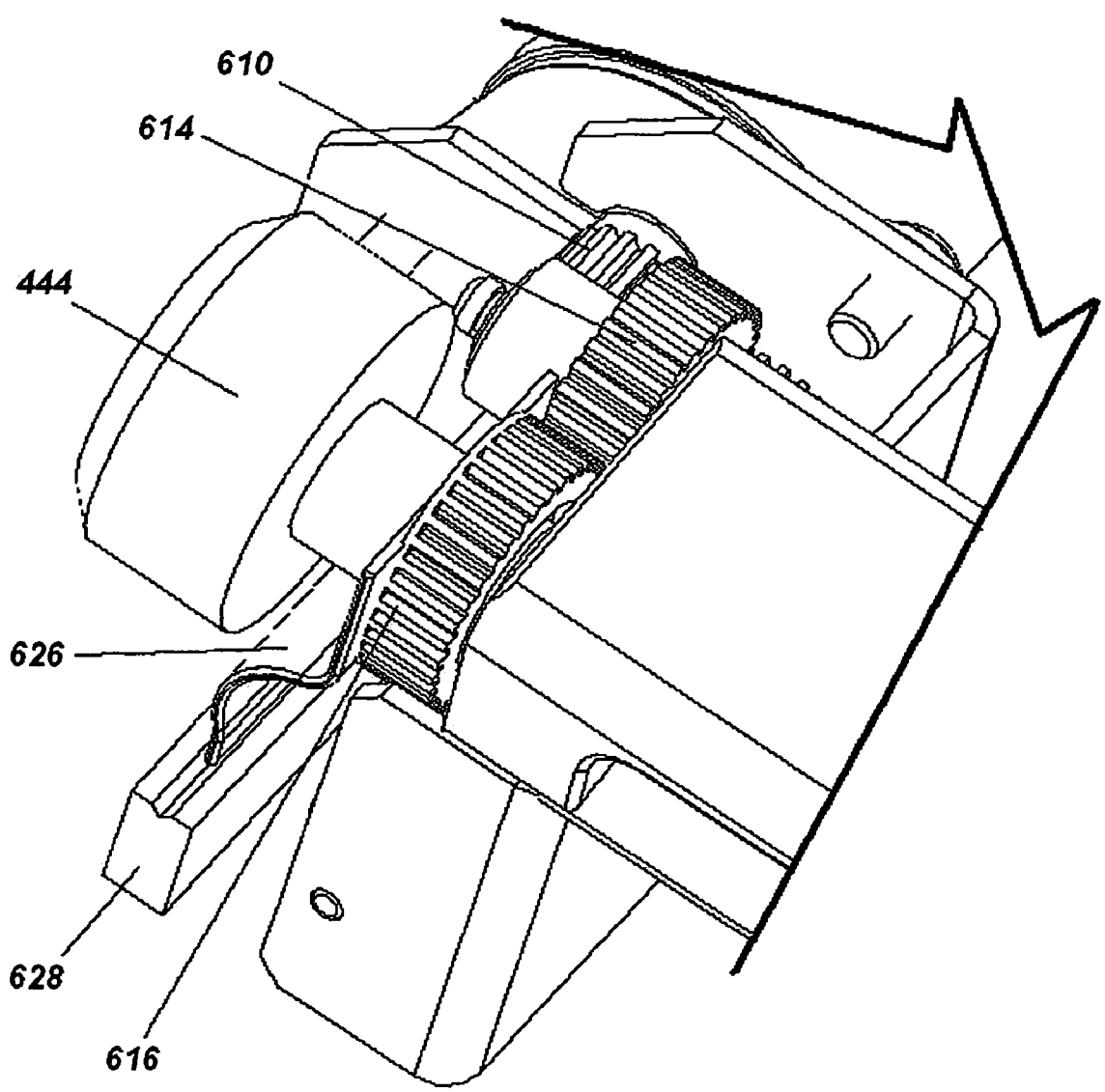
FIG. 6E is an isometric plan view of the top, rear sides of the upper and lower paper port roller gears shown in FIGS. 6C and 6D in accordance with the preferred embodiment of the present invention illustrating the position of the mechanical trigger when the upper paper port roller gear is in an engaged position with respect to the lower paper port roller gear.
Figure 6F:
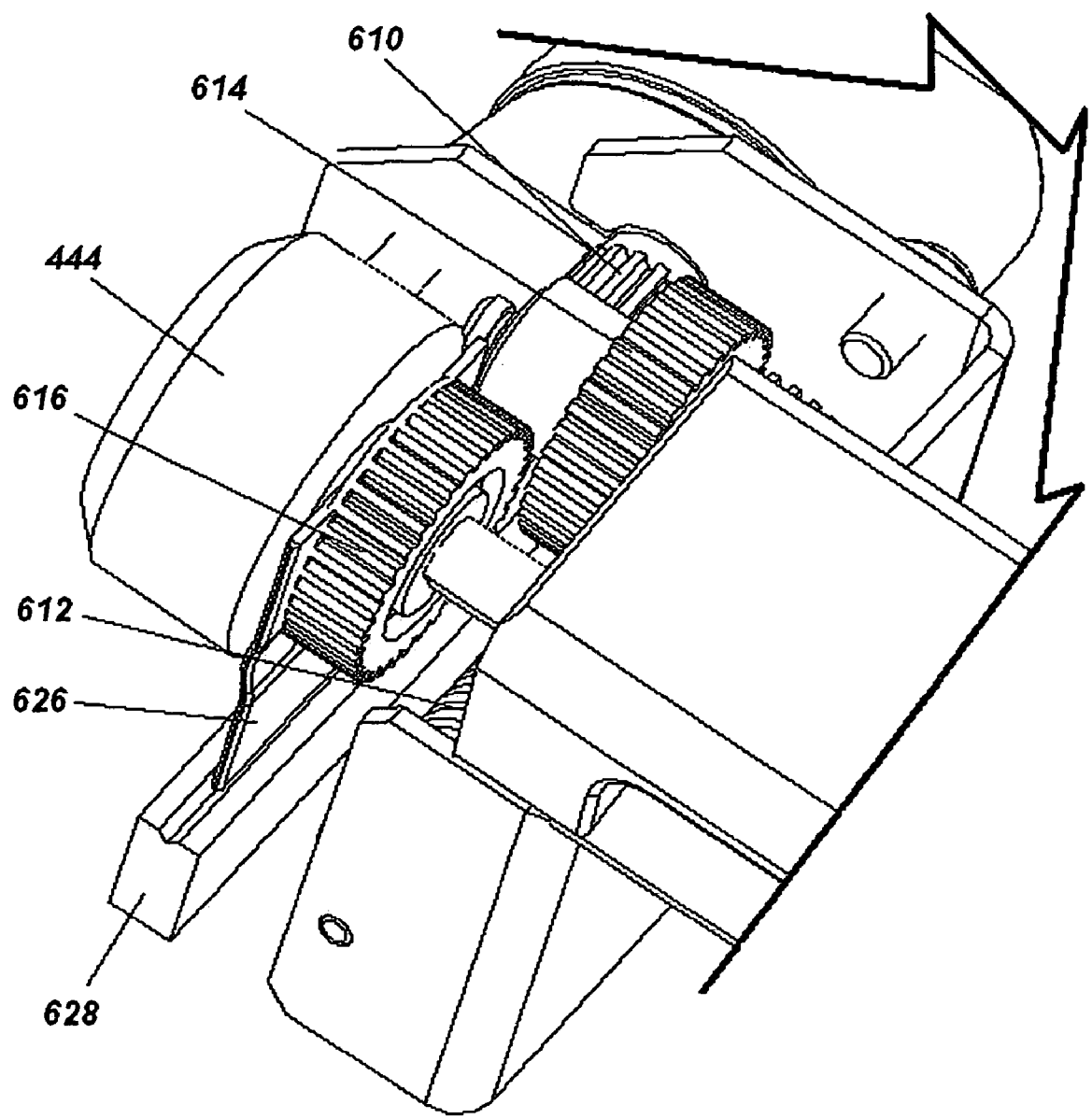
FIG. 6F is an isometric plan view of the top, rear sides of the upper and lower paper port roller gears shown in FIGS. 6C and 6D in accordance with the preferred embodiment of the present invention illustrating the position of the mechanical trigger when the upper paper port roller gear is in a disengaged position with respect to the lower paper port roller gear.

Referring next to FIGS. 6E and 6F, depicted is an isometric plan view of the top and rear of upper paper port roller gear 616 in an engaged and disengaged position, respectively, with respect to lower paper port roller gear 614. FIGS. 6E and 6F detail the location of mechanical trigger 626 with respect to upper paper port roller gear 616, actuator 444, and support 628 in both the engaged and disengaged position, respectively. As depicted, mechanical trigger 626 is a spring leaf mounted under compression between support 628 and actuator 444 that holds upper paper port roller gear 616 in an engaged or disengaged position with respect to lower paper port roller gear 614 via the spring force of mechanical trigger 626. When control subsystem 410 needs to change the state of upper paper port roller gear 616 (i.e., from engaged to disengaged, or disengaged to engaged, with respect to lower paper port roller gear 614), control subsystem drives actuator 444 until the maximum compression point of mechanical trigger 626 is overcome, and the spring force of mechanical trigger 626 forces upper paper port roller gear 616 to the opposite position.

Turning next to FIGS. 7 through 15, flowcharts illustrate the software operation of electronic device 110. System controller 412 and PLD 424 run software programs in a real-time operating system ("RTOS"). The RTOS may be proprietary or commercially available. In the preferred embodiment of the present invention, the RTOS is based on the Linux® operating system kernel for an embedded environment. As a result of this selection, the interfaces for serial RS232 port 128, IrDA® port 134, and USB port 130 are standard drivers offered with the Linux® embedded distribution. The RTOS is responsible for controlling all low-level hardware systems, monitoring events, and dispatching requests based on environmental and user inputs.

Figure 7:
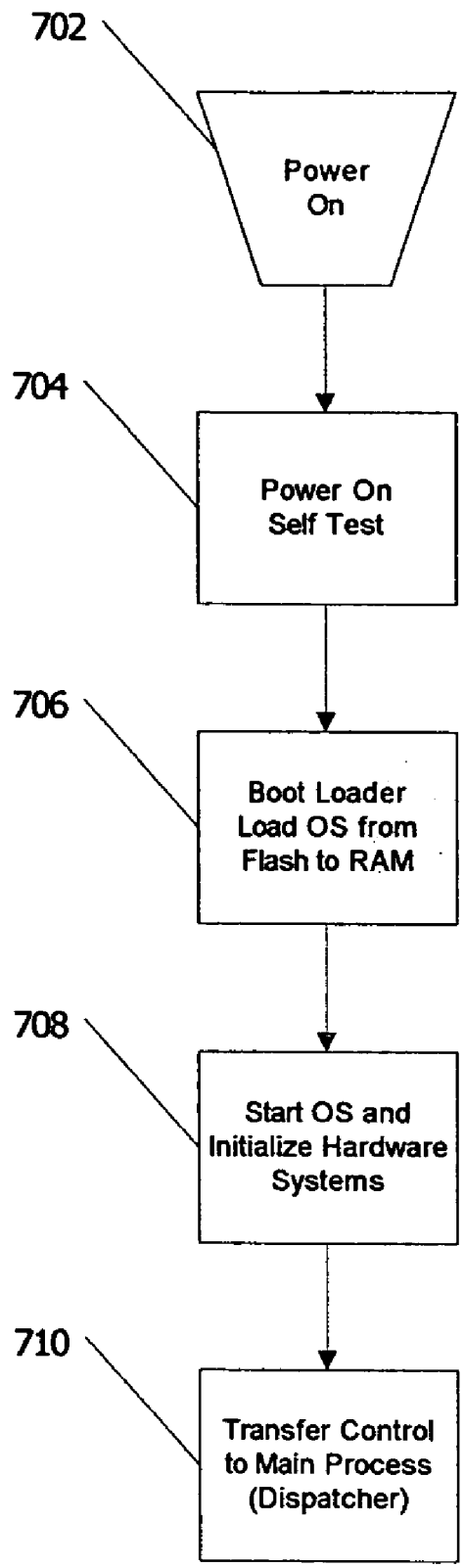
FIG. 7 is a flowchart illustrating the operation of the startup algorithm executed by the electronic device in accordance with the preferred embodiment of the present invention.
Figure 8:
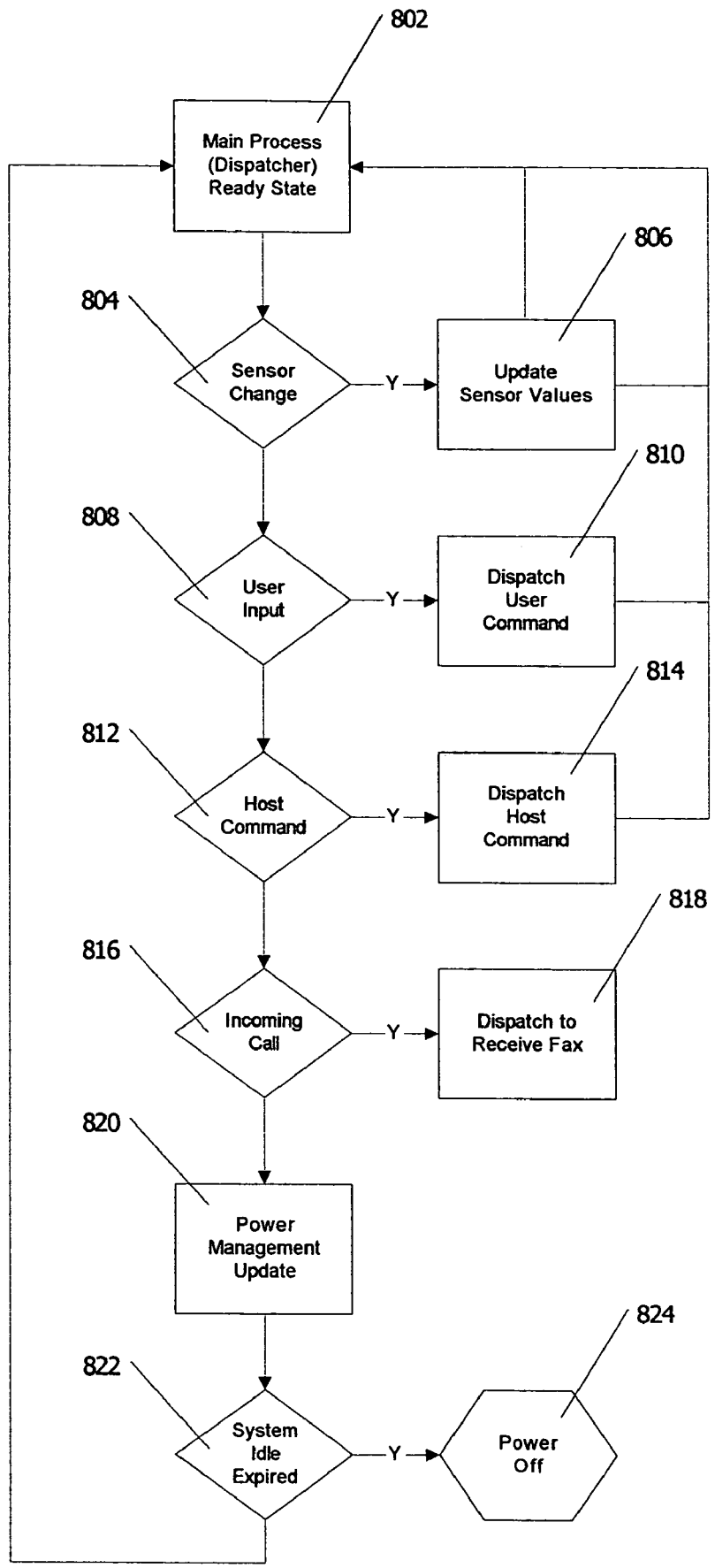
FIG. 8 is a flowchart illustrating the operation of the dispatcher algorithm executed by the electronic device in accordance with the preferred embodiment of the present invention.

Referring to FIG. 7, after power is initially turned on by the user (step 702), a power-on self-test algorithm is performed (step 704). When the self-test is complete, the RTOS loads from flash memory 416 (FIG. 4) to RAM 418 (FIG. 4) (step 706). Once the RTOS has been transferred to RAM 418 (FIG. 4), the RTOS is started and the hardware systems are initialized (step 708). After all hardware systems have been initialized, control is passed to the dispatcher algorithm (See. FIG. 8)(step 710), also executed in the RTOS.

Referring next to FIG. 8, depicted is the dispatcher algorithm, which maintains primary control of the system after the initial boot-up and self-checks are performed. Generally, the dispatcher monitors sensor changes to diagnose and implement functions (e.g., scan and print readiness, alignment of paper, line print handling, actuator 444 control, etc.), monitors and processes user input (e.g., input via numeric keys 118, function keys 120, etc.), dispatches hardware system events (e.g., timers, control of motor 440, etc.), processes time related tasks, manages the real-time clock system, monitors the external communication systems (e.g., for interaction with mobile telephones, PDAs, desktop PCs, etc.), and monitors systems for performance of self-diagnostics. Depending on the specific task being performed, the dispatcher algorithm may temporarily transfer control to other algorithms (e.g., the print algorithm (FIG. 9), the scan algorithm (FIG. 11), the copy algorithm (FIG. 12), the transmit fax algorithm (FIG. 13), the receive fax algorithm (FIG. 15), etc.) or may transmit signals to other such algorithms executed internal to electronic device 110.

More specifically, the dispatcher algorithm begins in its ready state (step 802) and is responsible for detecting sensor changes (step 804), upon which the sensor values are updated (step 806). Also, the dispatcher algorithm monitors for user input (step 808) (e.g., data input via keypad 114), host commands (step 812), and incoming calls (step 816) and, upon detecting same, responds with a dispatch user command (step 810), a dispatch host command (step 814), or a dispatch to receive fax command (step 818), respectively.

Additionally, the dispatcher algorithm minimizes power consumption by performing power management updates (step 820), which disable various components of electronic device 110 when these components are not required. The disabled components include minimal power consumers such as display 116, as well as more significant power consumers such as Bluetooth® and 802.11 accessory modules 132. Alternatively, these updates may also reduce power consumption by placing system controller 412 in a "sleep" mode. In this mode, if a telephone call is received or if a user presses a numeric key 118 or function key 120, system controller 412 instantly "wakes up" and returns to normal operation. Finally, the dispatcher algorithm monitors the system idle time (step 822). Upon exceeding a predetermined idle time period, the dispatcher algorithm automatically removes power from (step 824) electronic device 110.

Figure 9:
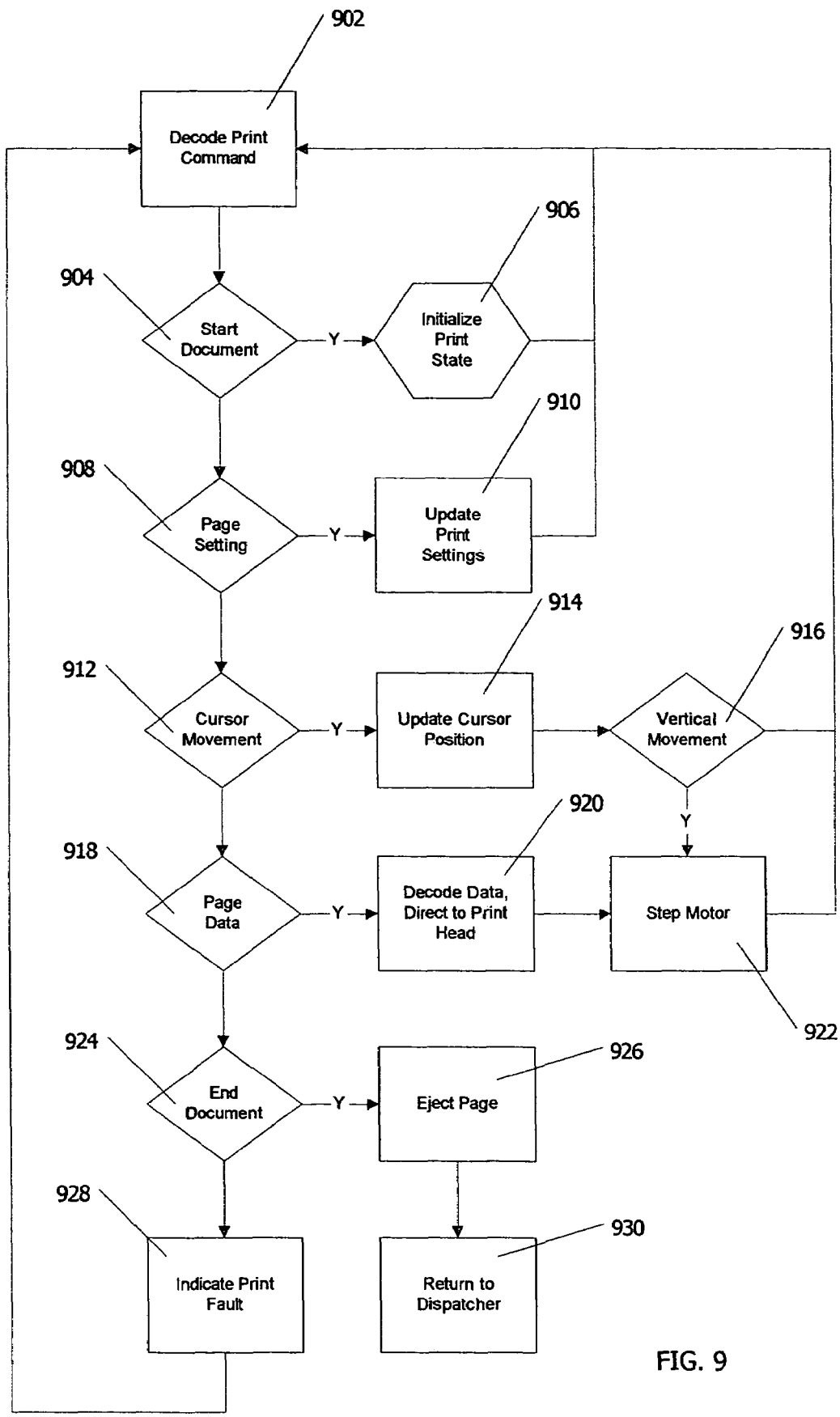
FIG. 9 is a flowchart illustrating the operation of the print algorithm executed by the electronic device in accordance with the preferred embodiment of the present invention.

Turning next to FIG. 9, depicted is the print algorithm of the preferred embodiment of the present invention. Electronic device 110 is capable of printing data received from an interfaced device (e.g., a PC, PDA, external floppy disk drive, external compact disc ("CD") ROM drive, external flash disk, etc.) via an integral communication port (e.g., PSTN port 126, RS-232 port 128, USB port 130, or IrDA® port 134) or accessory module 132.

Electronic device 110 supports standard print functions such as page control functions (e.g., resolution, page eject, etc.), page formatting functions (e.g., margins, paper size, etc.), cursor functions (e.g., movement of cursor position, paper advance, etc.), graphics download functions (e.g., raster line printing, etc.), and conversion of ASCII text to raster output. Also, to support printing, electronic device 110 includes printer driver software, which offers print compatibility with commonly used operating systems such as Windows®, Macintosh®, etc.

Still referring to FIG. 9, the print algorithm initially decodes the print command (step 902). If the decoded command is an initial start printing command (step 904), the print state is initialized (step 906). Thereafter, the print algorithm continues to decode the print commands and upon decoding either a page setting (step 908) or cursor movement (step 912), the algorithm updates the print settings (step 910) or the cursor position (step 914), respectively. Additionally, page data is decoded (step 918) and transmitted directly to print head 434 (FIG. 4). Stepping of motor 440 (step 922) is performed if the algorithm determines that vertical movement of upper paper port roller 620 is required (steps 916 or 920). As part of step 920, the print algorithm also executes a print power management algorithm, as discussed in detail below with respect to FIG. 10.

Upon receiving an end print command (step 924), the printed page is ejected (step 926) and the print algorithm returns control to the dispatcher algorithm, as discussed above with respect to FIG. 8. Alternatively, an unsuccessful print will result in a print fault (step 928), whereupon the user will be notified that a printing error has occurred.

Figure 10:
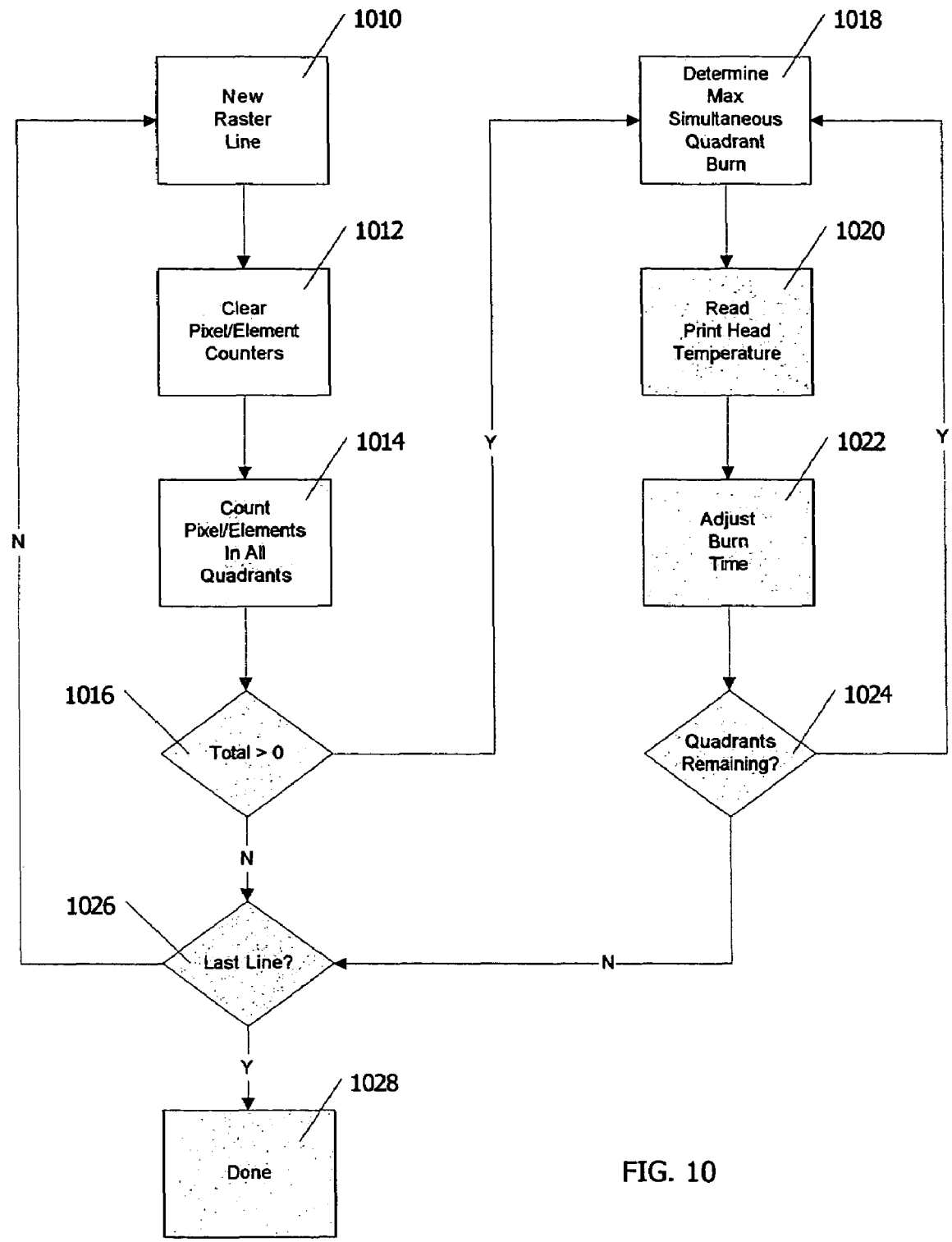
FIG. 10 is a flowchart illustrating the operation of the print power management algorithm executed by the electronic device in accordance with the preferred embodiment of the present invention.

Referring now to FIG. 10, to maximize battery life, the print algorithm discussed above with respect to FIG. 9 includes a print power management algorithm. This algorithm saves power by looking ahead to minimize the power consumed during the print function. More specifically, when the print power management algorithm begins to print a new raster line (step 1010), it first clears the pixel/element counters (step 1012). Next, the print power management algorithm counts all pixels/elements in all quadrants of the raster line (step 1014). If the total quantity of pixel/elements is greater than zero, as determined during step 1016, the print power management algorithm determines the maximum number of elements that can be burned simultaneously in all quadrants (step 1018).

Thereafter, the print power management algorithm reads the print head temperature (step 1020) and adjusts the burn time, if necessary, based upon the instantaneous print head temperature (step 1022). Next, the print power management algorithm determines whether any additional quadrants require printing (step 1024). If yes, the print power management algorithm returns to step 1018. If no, the print power management algorithm determines whether the last line has been printed (step 1026). Similarly, at step 1016, if the print power management algorithm determines that the total quantity of pixel/elements is zero, step 1026 is also performed.

If the last line has not been printed, the print power management algorithm returns to step 1010, and the entire print power management algorithm begins again. If the last line has been printed, the print power management algorithm completes (step 1028) and returns to the dispatcher algorithm depicted in FIG. 8. However, if a print fault occurs, the print power management algorithm returns to step 902 (FIG. 9), the print data is discarded, and control is then returned to the dispatcher algorithm, as discussed above with respect to FIG. 8.

Figure 11:
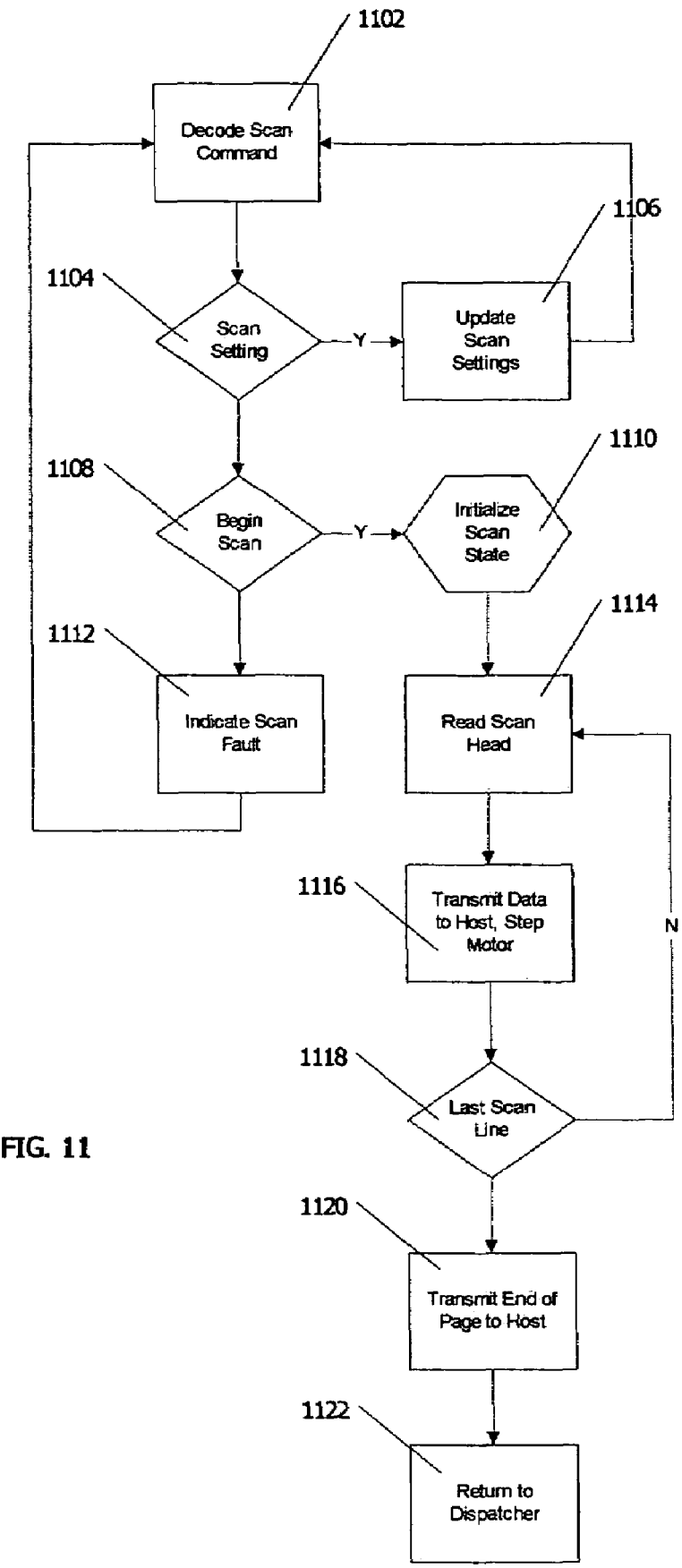
FIG. 11 is a flowchart illustrating the operation of the scan algorithm executed by the electronic device in accordance with the preferred embodiment of the present invention.

Turning now to FIG. 11, depicted is the scan algorithm. Electronic device 110 is capable of scanning images on media input to lower paper port 136 (See FIG. 1) and transmitting the scanned data to an interfaced device (e.g., a PC, PDA, external floppy disk drive, external CD ROM drive, external flash disk, etc.) via an integral communication port (e.g., PSTN port 126, RS-232 port 128, USB port 130, or IrDA® port 134) or accessory module 132.

When performing the scanning function, electronic device 110 is capable of operating in a "slave" mode, whereupon it receives its scan instructions from the external host (e.g., a PC, PDA, etc.). For example, if electronic device 110 is interfaced to a host PC via USB port 130, it is capable of receiving its scanning instructions from the host PC via the USB connection. Under this operating mode, the host PC initiates a scan document command.

To achieve this compatibility, electronic device 110 includes scanner driver software that is compatible with most popular operating systems (e.g., Windows®, Macintosh®, etc.). Similarly, the host PC is equipped, or loaded, with a conventional scanning software package that allows a PC user to initiate the scan command and allows electronic device 110 to "appear" on the host PC as if it were a conventional scanning device. Upon initiation of the scan command, the conventional scanning software instructs the scanner driver software of electronic device 110 via USB port 130 to perform the scan. In turn, the software driver instructs the electronic device 110 to scan the document. For maximum compatibility with third party equipment, the software driver of the preferred embodiment of the present invention supports the well known, commonly used TWAIN interface. This ensures compatibility between a third party device operating with TWAIN-compatible scanning software and electronic device 110.

As depicted in FIG. 11, the scan algorithm begins by decoding a scan command (step 1102). Decoded scan settings (step 1104) result in an update of the scan settings (step 1106) internal to electronic device 110. Upon receipt of a command to begin a scan (step 1108), the scan state is initialized (step 1110). Initialization of the scan state (step 1110) includes checking for the presence and alignment of the original media input to lower paper port 136 (FIG. 1) via lower and upper paper port detection sensors 210 and 212, respectively (FIG. 2), initializing scan head 432 (FIG. 4), and initializing motor 440 (FIG. 4). The latter operates to incrementally step motor 440 based on the resolution desired by the scanning application.

After initialization of the scan state (step 1110), raster line data is read via scan head 432 (FIG. 4). The scan algorithm then prepares the retrieved raster line data for transmission to the host (e.g., compresses the scanned raster line data). After processing, the data is transmitted to the host and motor 440 is stepped (step 1116). If the last line of scan data is received (step 1118), an end of page message is transmitted to the host (step 1120) and the scan algorithm returns control to the dispatcher algorithm, as discussed above with respect to FIG. 8. Alternatively, if an error occurs during the scan process, a scan fault message is transmitted to the user (step 1112).

Figure 12:
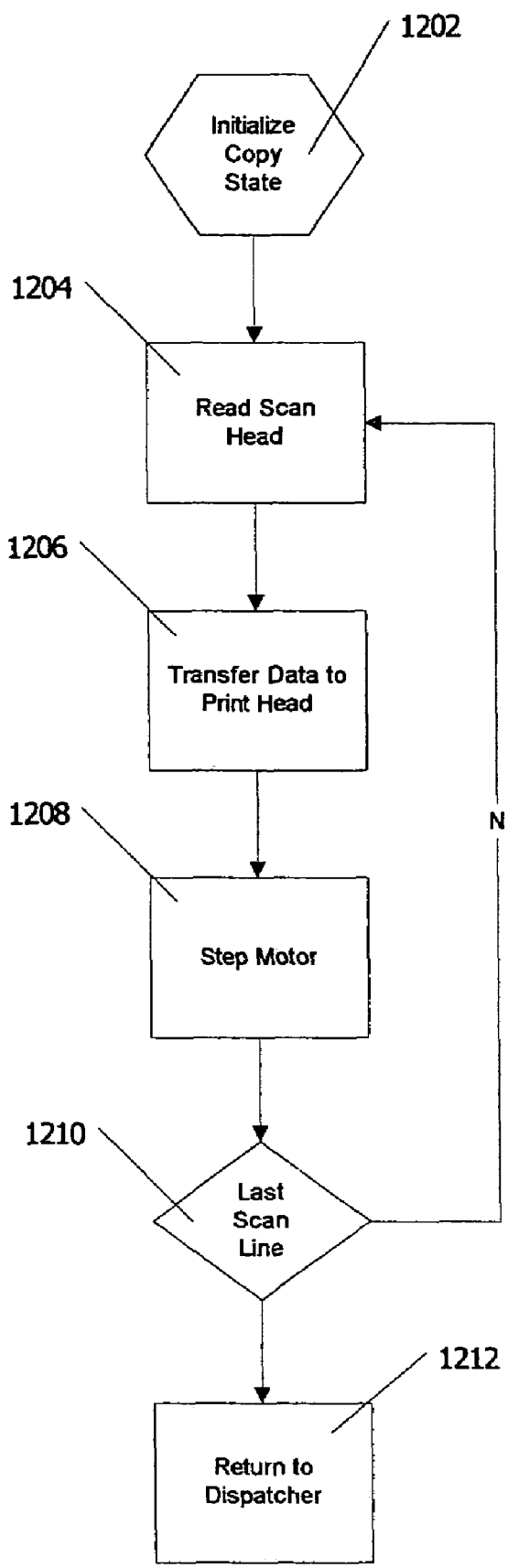
FIG. 12 is a flowchart illustrating the operation of the copy algorithm executed by the electronic device in accordance with the preferred embodiment of the present invention.

Referring next to FIG. 12, depicted is the copy algorithm. In the preferred embodiment of the present invention, the copy function of electronic device 110 occurs when initiated by the user via the respective function key 120, or automatically when the auto-copy mode is enabled. When the auto-copy mode is enabled, the copy operation automatically starts when lower paper port detection sensors 210 (FIG. 2) detect that original media has been inserted into lower paper port 136 (FIG. 1) and upper paper port detection sensors 212 (FIG. 2) confirm that recording media has been properly inserted into upper paper port 138.

Still referring to FIG. 12, the copy algorithm begins by initializing the copy state (step 1202). Initialization of the copy state will not complete until lower paper port detection sensors 210 (FIG. 2) confirm that the original media to be copied has been properly inserted into lower paper port 136 (FIG. 1), and until upper paper port detection sensors 212 (FIG. 2) confirm that the recording media upon which the copy will be printed has been properly inserted into upper paper port 138 (FIG. 1). When both of these conditions are satisfied, the image on the original media is read via scan head 432 (FIG. 4) (step 1204). Next, the scanned image data is transferred directly to print head 434 (FIG. 4) (step 1206). Motor 440 is continually stepped (step 1208) during the scanning process until all lines have been scanned and transferred to print head 434 (FIG. 4) (step 1210). Upon completion of the copy algorithm, control is returned to the dispatcher algorithm, as discussed above with respect to FIG. 8.

Figure 13:
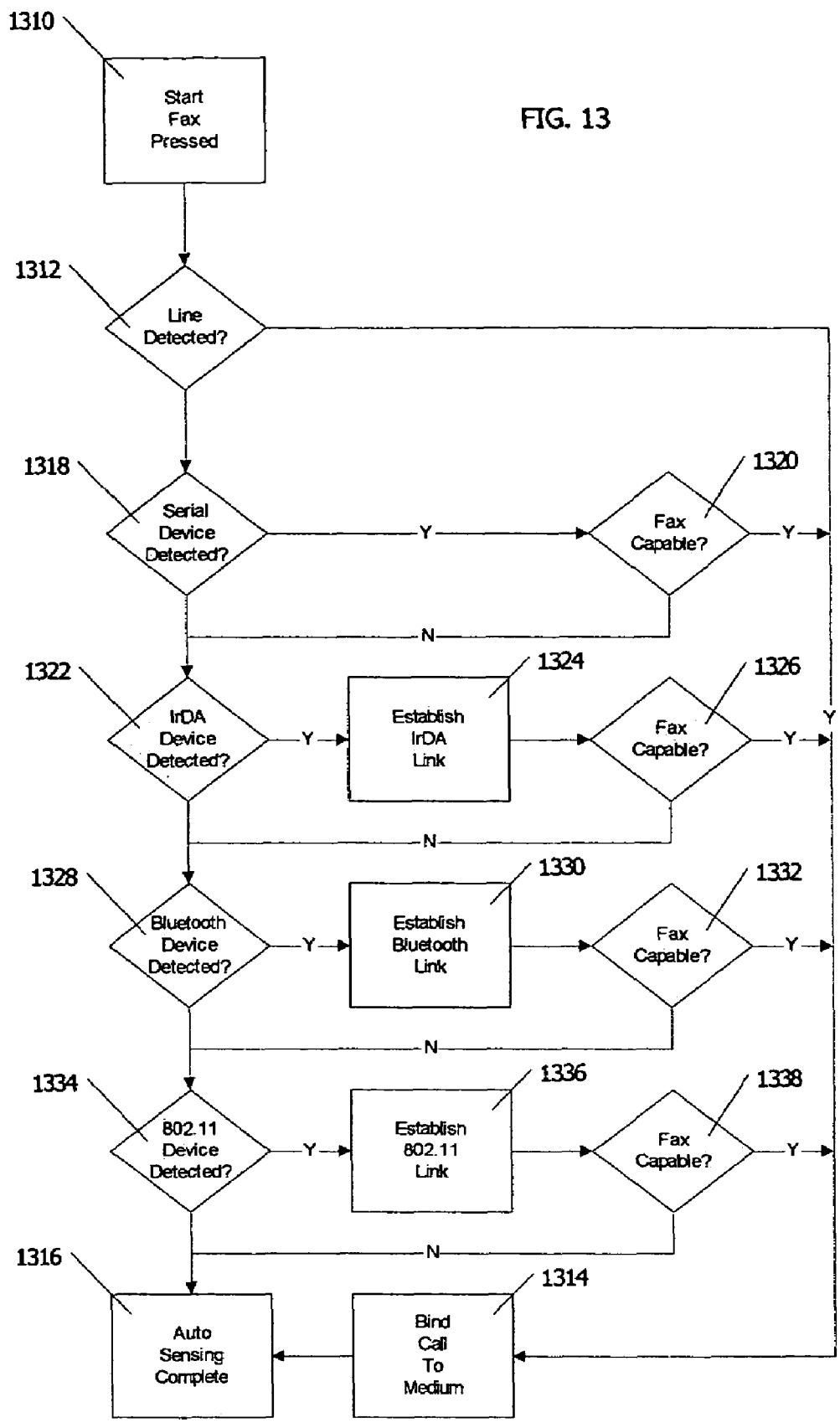
FIG. 13 is a flowchart illustrating the operation of the auto-sensing algorithm executed by the electronic device in accordance with the preferred embodiment of the present invention.

Referring now to FIG. 13, depicted is the auto-sensing algorithm that executes at the beginning of the transmit fax algorithm discussed below with respect to FIG. 14. This algorithm continuously checks to see if a mobile device (e.g., a cellular device) has been detected (steps 1402 and 1404). The auto-sensing sub-algorithm determines if a mobile fax-capable device is connected to one of the interfaces (e.g., PSTN port 126, RS-232 port 128, IrDA® port 134, USB port 130, or accessory module 132) of electronic device 110, and, if yes, automatically reconfigures electronic device 110 to interface to the device such that a fax may be transmitted without requiring the user to re-program electronic device 110.

The auto-sensing algorithm begins when the start fax button is pressed (step 1310) via keypad 114. First, the auto-sensing algorithm determines whether a PSTN line is connected to PSTN port 126 (step 1312). If yes, the auto-sensing algorithm binds the call to the medium (step 1314). Thereafter, the auto-sensing algorithm ends (step 1316) and returns to the transmit fax algorithm depicted in FIG. 12.

Alternatively, if the auto-sensing algorithm determines that a PSTN line is not connected to PSTN port 126 (step 1312), it then polls serial port 128 (step 1318). If a serial device is detected as connected to serial port 128, the auto-sensing algorithm determines whether the serial device is fax-capable (step 1320). If the serial device is determined to be fax-capable, the auto-sensing algorithm proceeds to step 1314 as discussed above.

If the serial device is not fax-capable as determined during step 1320, the algorithm then polls IrDA® port 134 (step 1322). If an IrDA® device is sensed, an IrDA® link is established (step 1324) to determine if the IrDA® device is fax-capable (step 1326). If yes, the auto-sensing algorithm proceeds to step 1314 as discussed above.

If the IrDA® device is not fax-capable, as determined during step 1326, the algorithm then polls the accessory module 132, if any, present in accessory module bay 142 (step 1328) to determine if a Bluetooth® device is present. If a Bluetooth® device is sensed, a Bluetooth® link is established (step 1330) to determine if the Bluetooth® device is fax-capable (step 1332). If yes, the auto-sensing algorithm proceeds to step 1314 as discussed above.

If the Bluetooth® device is not fax-capable, as determined during step 1332, the algorithm then polls the accessory module 132, if any, present in accessory module bay 142 (step 1334) to determine if an 802.11 device is present. If an 802.11 device is sensed, an 802.11 link is established (step 1336) to determine if the 802.11 device is fax-capable (step 1338). If yes, the auto-sensing algorithm proceeds to step 1314 as discussed above. If no, the auto-sensing algorithm ends (step 1316) and returns to the transmit fax algorithm depicted in FIG. 14.

Figure 14:
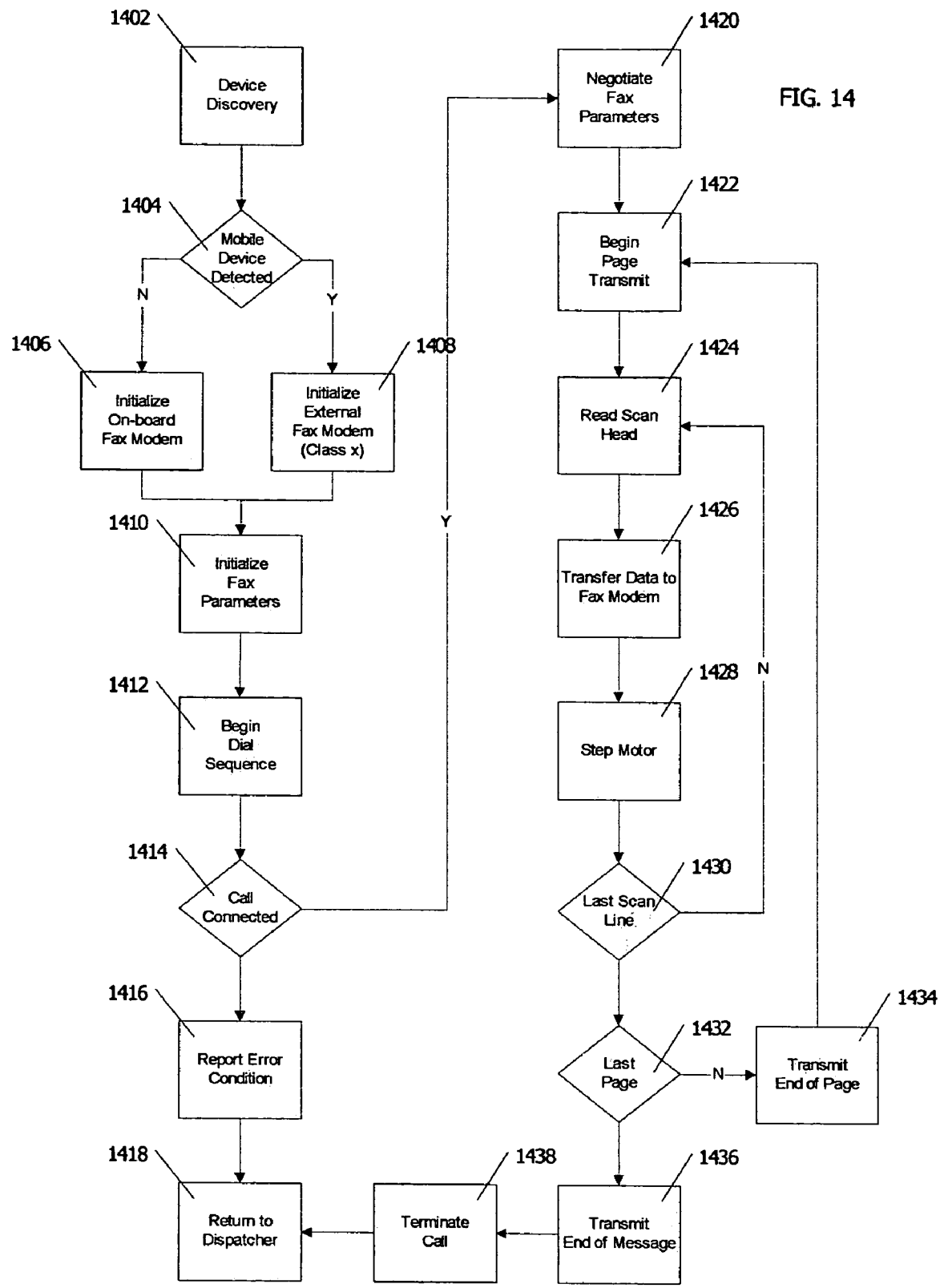
FIG. 14 is a flowchart illustrating the operation of the transmit fax algorithm executed by the electronic device in accordance with the preferred embodiment of the present invention.

Turning next to FIG. 14, the transmit fax algorithm is depicted. As discussed above, electronic device 110 is capable of transmitting and receiving faxes via conventional PSTN lines or via commercial mobile networks (e.g., cellular networks such as Sprint® PCS, Verizon®, AT&T® Wireless, etc.). Similar to a conventional fax machine, electronic device 110 requires that the user first load the document to be faxed, and then enter the telephone number of the destination fax machine by pressing the corresponding numeric keys 118 on keypad 114 (FIG. 1). As numeric keys 118 are pressed, Dual Tone Multiple Frequency ("DTMF") tones are provided audibly and the digits are displayed visually on display 116 (FIG. 1). Once the user has entered the entire telephone number, the appropriate function key 120 (FIG. 1) is pressed to initiate the transmit fax algorithm.

At step 1402, if the auto-sensing algorithm (see FIG. 13) detected a PSTN line connected to PSTN port 126, on-board data modem device 426 is initiated (step 1406). In contrast, if a PSTN line was not detected but an external, mobile, fax-capable device was detected, the external mobile device is initialized (step 1408) and the faxing operation is redirected to the mobile fax-capable device using the fax Class 1.0, Class 2, or Class 2.0 fax communication specification (i.e., International Telecommunications Union ("ITU") T.31, T.32, etc.). Using the latter method, the mobile fax-capable device appears as a modem, and the underlying network is abstracted through this interface. During this initialization step 1408, the level of fax compatibility (i.e., Class 1, Class 2, or Class 2.0) of the mobile fax-capable device is determined.

Irrespective of whether an on-board or external fax-capable device is initialized, next, the fax parameters are initialized (step 1410). If the PSTN is the communication medium of choice, this step includes performing all line status functions such as checking for a dial tone.

Thereafter, the transmit fax algorithm performs the dial sequence to dial the telephone number associated with the destination fax machine (step 1412). This sequence occurs until electronic device 110 is connected to the destination fax machine (step 1414). If the call cannot be connected, an error condition is reported to the user (step 1436) and control is returned to the dispatcher algorithm (FIG. 8) (step 1418).

Upon a successful connection to the destination fax machine, the fax parameters are negotiated (step 1420). In the preferred embodiment of the present invention, if the on-board data modem device 426 (FIG. 4) and a PSTN line are the method of transmission, fax parameters are negotiated as per the T.30 communication protocol, and DAA 430 is used to compensate for physical variations in dialing networks, as well as country-specific telephone equipment regulations. In contrast, if a mobile fax-capable device is the transmission method, the mobile fax-capable device is instructed to perform the fax parameter negotiations.

Thereafter, a beginning of page message is transmitted to the destination fax machine (step 1424). Page data is then read by scan head 432 (FIG. 4) (step 1424), compressed using standard fax compression techniques, and transferred to data modem device 426 (FIG. 4) (step 1426) for transmission to the destination fax machine. Motor 440 is continually stepped (step 1428) until all lines of data for the current page have been scanned and transferred to data modem device 426 (FIG. 4)(step 1430).

Upon completion of the scanning of all data associated with the current page of the fax transmission, the transmit fax algorithm performs a check to determine if there are additional pages to transmit (step 1436). If an additional page is sensed in lower paper port 136 (FIG. 1) via lower paper port detection sensors 210 (FIG. 2) within a predetermined, pre-programmed time period, the transmit algorithm recognizes that an additional page requires transmission, and an end of page message is transmitted to the destination fax machine (step 1434). Then, the transmit fax algorithm returns to step 1424 and performs the same method described above for each of the remaining pages of the fax transmission.

If an additional page is not sensed in lower paper port 136 (FIG. 1) during a predetermined time period, the transmit algorithm determines that the final page of the fax transmission has been scanned and sent to the destination fax machine. In response, an end of fax message is transmitted to the destination fax machine (step 1436), the call is terminated (step 1438), and control is returned to the dispatcher algorithm (See FIG. 8).

Figure 15:
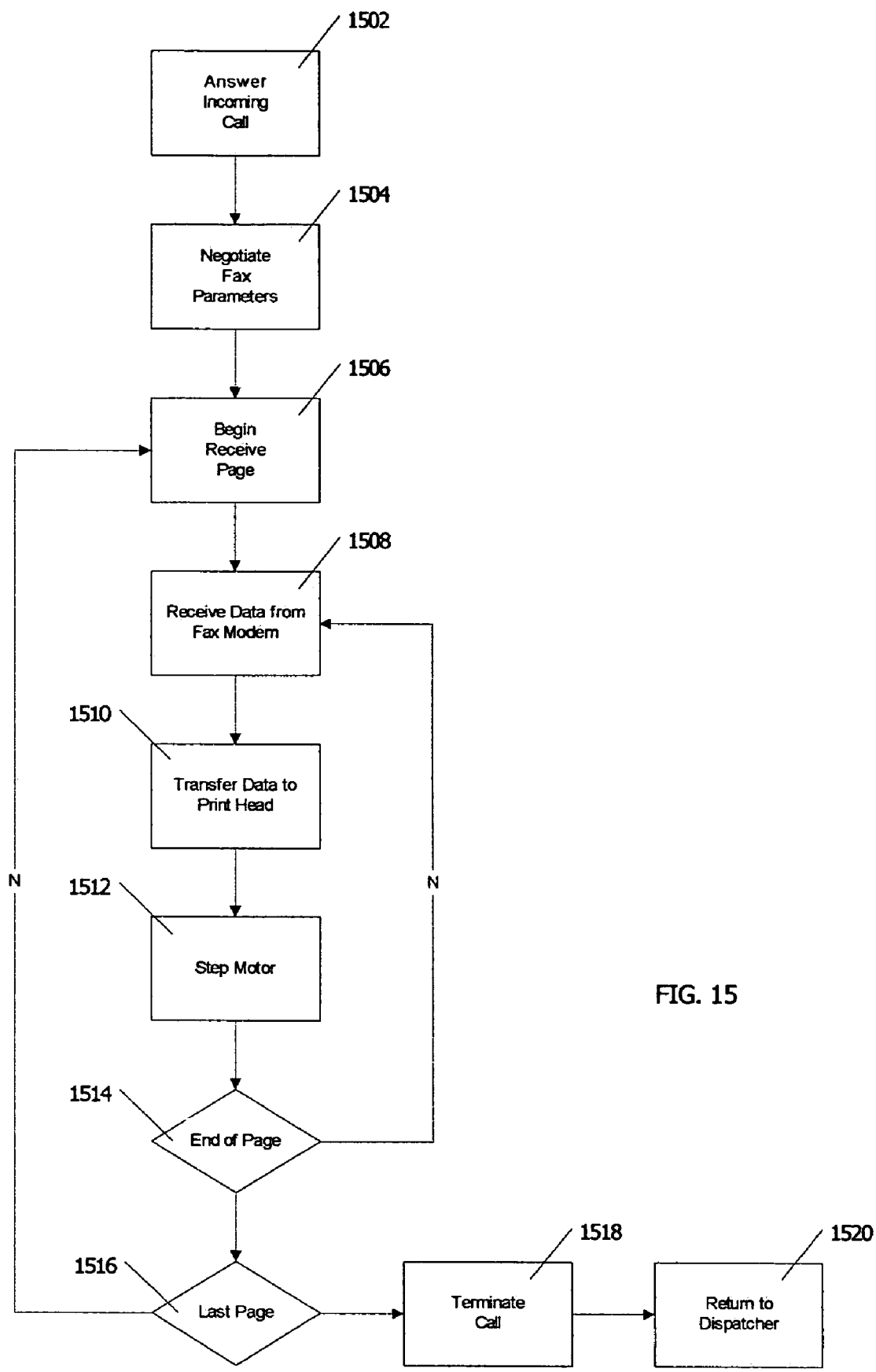
FIG. 15 is a flowchart illustrating the operation of the receive fax algorithm executed by the electronic device in accordance with the preferred embodiment of the present invention.

Next, referring to FIG. 15, the receive fax algorithm is depicted. This algorithm begins by answering an incoming call (step 1622). After answering, fax parameters are negotiated (step 1624) between electronic device 110 (FIG. 1) and the transmitting fax machine. Next, electronic device 110 (FIG. 1) receives a beginning of page message from the transmitting fax machine (step 1612). Thereafter, electronic device 110 begins receiving the first page of the incoming fax transmission (step 1610). The received data is then transferred to print head 434 (FIG. 4) (step 1510), unless paper is not detected.

In the latter scenario, the received fax data will automatically be stored to a memory location as long as memory is available. If electronic device 110 exceeds its memory capacity during fax reception, the originating fax machine will receive a memory overflow message as per the fax protocol used for the fax transmission (e.g., the T.30 protocol). When paper is restored to electronic device 110, the stored fax data will be printed.

Also, the stored faxes shall be retained in memory after printing to allow an external device (e.g., laptop, PC, etc.) connected to electronic device 110 via one of its communication ports to access the stored faxes. More specifically, electronic device 110 provides file system descriptors to the external device (e.g., laptop, PC, etc.) to allow the external device to "see" stored faxes, as well as other stored files (e.g., scanned documents) as .tif files. These .tif files may then be manipulated (e.g., saved to the external device's hard drive, printed, etc.) at the user's discretion. In the preferred embodiment of the present invention, this "store data" feature may be enabled or disabled by the user via user interface 112.

Stepping of motor 440 is synchronized with printing (step 1512) (as necessary to print the received fax page. When an end of page message is received from the transmitting fax machine (step 1514), a query is performed to determine whether this page is the final page of the fax transmission (step 1516). If no, the receive fax algorithm returns to step 1612, and waits for a beginning of page message from the transmitting fax machine. If yes, the telecommunication between electronic device 110 (FIG. 1) and the transmitting fax machine is terminated (step 1518) and control is returned to the dispatcher algorithm (FIG. 8).

Although the preferred embodiment of the present invention is capable of performing all of the functions discussed herein (i.e., faxing, scanning, copying, printing), embodiments of the present invention may also be designed to perform only one of these functions or two or more of these functions without departing from the spirit and scope of the present invention. Additionally, embodiments of the present invention may be designed to include one or more of the aforementioned functions plus additional functions (e.g., text messaging) not discussed herein, without departing from the spirit and scope of the present invention.

Furthermore, alternate embodiments are envisioned wherein one or more software programs may be implemented using alternative methods to those discussed herein (e.g., procedure-based techniques, component-based techniques, object-oriented techniques, etc.) without departing from the scope of the present invention. Specifically, software programs such as assembler, C, XML, C++ objects, Java®, and Microsoft® Foundation Classes ("MFC") may be implemented.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

The invention claimed is:

1. An apparatus for processing media, wherein said apparatus comprises:
   two rollers;
   at least one rotation mechanism coupled to at least one of said two rollers;
   an actuator;
   a mechanical trigger located between said actuator and a first of said two rollers;
   at least one circuit coupled to said rotation mechanism for control of said rotation mechanism, said at least one circuit coupled to said actuator for control of said actuator, said control of said actuator indexing said actuator to one of two positions via a temporary power pulse; and
   a housing enclosing said two rollers, said rotation mechanism, said mechanical trigger, said actuator, and said circuit;
   wherein said housing has at least one of the group consisting of a width less than 16 inches, a depth less than 12 inches, a height less than 12 inches, and a weight less than 6 pounds;
   wherein said rotation mechanism rotates at least one of said two rollers;
   wherein said rotation transports said media through said housing;

wherein indexing said actuator to a first of said two positions causes a spring force of said mechanical trigger to couple said first of said two rollers with a second of said two rollers; and wherein indexing said actuator to a second of said two positions causes said spring force of said mechanical trigger to uncouple said first of said two rollers from said second of said two rollers.

2. An apparatus according to claim 1, said apparatus further comprising:
at least one sensor coupled to at least one of said circuits and located internal to said housing;
wherein said sensor senses at least one of the group consisting of presence and alignment of said media.

3. An apparatus according to claim 1, said apparatus further comprising:
at least one communication port coupled to at least one of said circuits wherein at least a portion of said communication port is located internal to said housing.

4. An apparatus according to claim 3, wherein said communication port is at least one of the group consisting of a PSTN port, a serial port, an Infrared Data Association® port, a Universal Serial Bus port, a Bluetooth® port, an Ethernet port, and an Ultra Wide Band port.

5. An apparatus according to claim 1, said apparatus further comprising:
at least five communication ports coupled to at least one of said circuits wherein at least a portion of each of said communication ports is located internal to said housing.

6. An apparatus according to claim 5, wherein each of said communication ports is one of the group consisting of a PSTN port, a serial port, an Infrared Data Association® port, a Universal Serial Bus port, a Bluetooth® port, an Ethernet port, and an Ultra Wide Band port.

7. An apparatus according to claim 1, said apparatus further comprising:
a bay coupled to at least one of said circuits wherein at least a portion of said bay is located internal to said housing;
wherein said bay couples a module to at least one of said circuits.

8. An apparatus according to claim 7, wherein said module includes one of the group consisting of a PSTN port, a serial port, an Infrared Data Association® port, a Universal Serial Bus port, a Bluetooth® port, an Ethernet port, and an Ultra Wide Band port.

9. An apparatus according to claim 7, wherein at least one of said circuits performs at least one of the group consisting of automatically sensing said module and automatically determining a communication protocol associated with said module.

10. An apparatus according to claim 7, said apparatus further comprising:
a programmable device.

11. An apparatus according to claim 10, wherein at least one of said circuits performs at least one of the group consisting of automatically sensing said module, automatically determining a communication protocol associated with said module, and automatically programming said programmable device to communicate with said module.

12. An apparatus according to claim 1, wherein said apparatus performs at least one of the group consisting of scanning media, faxing media, printing media, copying media, transmitting media via telefacsimile, and receiving telefacsimiles.

13. An apparatus according to claim 1, said apparatus further comprising:
at least one battery located internal to said housing;
wherein said battery allows said apparatus to operate via battery power.

14. An apparatus according to claim 1, said apparatus further comprising:
at least two apertures through said housing;
wherein at least one of said apertures allows at least one of said media to be inserted through said aperture until at least one of said media couples to at least one of said two rollers; and
wherein each of said apertures is located at a distinct vertical height with respect to a forward facing surface of said apparatus.

15. An apparatus according to claim 14, said apparatus further comprising:
at least one user interface located on an angled, upward and forward facing surface of said apparatus;
wherein insertion of at least one of said media into at least one of said apertures does not obstruct said user interface.

16. An apparatus according to claim 14, said apparatus further comprising:
at least one user interface located on an angled, upward and forward facing surface of said apparatus;
wherein simultaneous insertion of one of said media into each of said apertures does not obstruct said user interface.

17. An apparatus according to claim 1, said apparatus further comprising:
a print head for printing data on media transported by a first of said two rollers; and
a scan head for scanning data present on said media transported by a second of said two rollers.

18. An apparatus according to claim 17, wherein said apparatus transfers said data scanned by said scan head directly to said print head for printing on said media transported by said first of said two rollers.

19. An apparatus according to claim 14, said apparatus further comprising:
at least two rear apertures through a rear facing surface of said housing;
wherein at least one of said apertures allows at least one of said media to exit said apparatus through said aperture; and
wherein each of said rear apertures is located at a distinct vertical height with respect to a rear facing surface of said apparatus.

20. An apparatus according to claim 1, wherein said apparatus includes two independent paper paths.

* * * * *